US008787421B2

(12) United States Patent
Lee et al.

(10) Patent No.: US 8,787,421 B2
(45) Date of Patent: Jul. 22, 2014

(54) TRANSMITTING SPREAD SIGNAL IN COMMUNICATION SYSTEM

(71) Applicant: LG Electronics Inc., Seoul (KR)

(72) Inventors: Jung Hoon Lee, Anyang-si (KR); Ki Jun Kim, Anyang-si (KR); Dong Wook Roh, Anyang-si (KR); Daewon Lee, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/030,747

(22) Filed: Sep. 18, 2013

(65) Prior Publication Data

US 2014/0023121 A1   Jan. 23, 2014

Related U.S. Application Data

(63) Continuation of application No. 13/757,700, filed on Feb. 1, 2013, now Pat. No. 8,582,626, which is a
(Continued)

(30) Foreign Application Priority Data

Jan. 25, 2008 (KR) ........................ 10-2008-0007935

(51) Int. Cl.
*H04B 1/69* (2011.01)
(52) U.S. Cl.
USPC ............................ 375/130; 375/146; 375/148
(58) Field of Classification Search
CPC .. Y02B 60/144; H04B 7/0413; H04B 7/0608; H04B 7/0802; H04L 1/0027; H04L 27/2672; H04L 5/0007; H04W 72/048; H04J 13/00; H04J 13/16

USPC ......... 375/130, 140, 141, 146, 147, 267, 299, 375/316, 347, 260; 370/329, 210, 335, 320, 370/342, 441, 445; 455/91, 132, 101
See application file for complete search history.

(56) References Cited

U.S. PATENT DOCUMENTS 5,870,391 A   2/1999  Nago
6,452,936 B1  9/2002  Shiino
(Continued)

FOREIGN PATENT DOCUMENTS

CN   1829373   9/2006
EP   1185001   3/2002
(Continued)

OTHER PUBLICATIONS

United States Patent and Trademark Office U.S. Appl. No. 13/295,987 Office Action dated Feb. 6, 2013, 8 pages.
(Continued)

*Primary Examiner* — Tesfaldet Bocure
(74) *Attorney, Agent, or Firm* — Lee, Hong, Degerman, Kang & Waimey

(57) ABSTRACT

A method for receiving Acknowledgement/Negative acknowledgement (ACK/NACK) information in a mobile communication system includes receiving a first signal including first spread ACK/NACK information and second spread ACK/NACK information from a first antenna set of a transmitting end in an orthogonal frequency division multiplexing (OFDM) symbol; receiving a second signal including third spread ACK/NACK information and fourth spread ACK/NACK information from a second antenna set of the transmitting end in an OFDM symbol; and de-spreading at least the first and third spread ACK/NACK information or the second and fourth spread ACK/NACK information for identifying the ACK/NACK information.

20 Claims, 17 Drawing Sheets

Related U.S. Application Data continuation of application No. 13/166,750, filed on Jun. 22, 2011, now Pat. No. 8,369,378, which is a continuation of application No. 12/139,261, filed on Jun. 13, 2008, now Pat. No. 8,009,720.

(60) Provisional application No. 60/943,783, filed on Jun. 13, 2007, provisional application No. 60/955,019, filed on Aug. 9, 2007, provisional application No. 60/976,487, filed on Oct. 1, 2007, provisional application No. 60/982,435, filed on Oct. 25, 2007, provisional application No. 60/983,234, filed on Oct. 29, 2007.

(56) References Cited

U.S. PATENT DOCUMENTS

| | | |
|---|---|---|
| 6,842,487 B1 | 1/2005 | Larsson |
| 6,934,318 B2 | 8/2005 | Sarkar |
| 7,069,050 B2 | 6/2006 | Yoshida |
| 7,315,577 B2 | 1/2008 | Shao |
| 7,336,633 B2 | 2/2008 | Kruys |
| 7,386,076 B2 | 6/2008 | Onggosanusi et al. |
| 7,954,032 B2 | 5/2011 | Kim et al. |
| 7,995,661 B2 | 8/2011 | Xu et al. |
| 2001/0005681 A1 | 6/2001 | Kim |
| 2001/0034236 A1 | 10/2001 | Tong et al. |
| 2003/0039227 A1 | 2/2003 | Kwak |
| 2003/0133426 A1 | 7/2003 | Schein et al. |
| 2004/0009780 A1 | 1/2004 | Dick et al. |
| 2004/0081131 A1 | 4/2004 | Walton et al. |
| 2004/0190640 A1 | 9/2004 | Dubuc et al. |
| 2005/0083977 A1 | 4/2005 | Moulsley et al. |
| 2005/0117536 A1 | 6/2005 | Cho et al. |
| 2005/0122898 A1 | 6/2005 | Jang et al. |
| 2005/0165949 A1 | 7/2005 | Teague |
| 2005/0220000 A1 | 10/2005 | Kim et al. |
| 2005/0232181 A1 | 10/2005 | Park et al. |
| 2005/0233754 A1 | 10/2005 | Beale |
| 2005/0286402 A1 | 12/2005 | Byun et al. |
| 2006/0013186 A1 | 1/2006 | Agrawal et al. |
| 2006/0045001 A1 | 3/2006 | Jalali et al. |
| 2006/0198294 A1 | 9/2006 | Gerlach |
| 2006/0209814 A1 | 9/2006 | Fujii |
| 2006/0250941 A1 | 11/2006 | Onggosanusi et al. |
| 2006/0264218 A1 | 11/2006 | Zhang et al. |
| 2006/0274842 A1 | 12/2006 | Pan et al. |
| 2006/0280256 A1 | 12/2006 | Kwon et al. |
| 2007/0064669 A1 | 3/2007 | Classon et al. |
| 2007/0097915 A1 | 5/2007 | Papasakellariou |
| 2007/0097942 A1 | 5/2007 | Gorokhov et al. |
| 2007/0097981 A1 | 5/2007 | Papasakellariou |
| 2007/0110104 A1 | 5/2007 | Sartori et al. |
| 2007/0149137 A1 | 6/2007 | Richardson et al. |
| 2007/0183533 A1 | 8/2007 | Schmidl et al. |
| 2007/0184849 A1 | 8/2007 | Zheng |
| 2007/0206559 A1 | 9/2007 | Cho et al. |
| 2007/0208986 A1 | 9/2007 | Luo et al. |
| 2007/0211667 A1 | 9/2007 | Agrawal et al. |
| 2007/0254662 A1 | 11/2007 | Khan et al. |
| 2007/0258373 A1 | 11/2007 | Frederiksen et al. |
| 2007/0258540 A1 | 11/2007 | Ratasuk et al. |
| 2008/0025247 A1 | 1/2008 | McBeath et al. |
| 2008/0025337 A1 | 1/2008 | Smith et al. |
| 2008/0090528 A1 | 4/2008 | Malladi |
| 2008/0095106 A1 | 4/2008 | Malladi et al. |
| 2008/0225784 A1 | 9/2008 | Tseng |
| 2008/0225791 A1 | 9/2008 | Pi et al. |
| 2008/0227398 A1 | 9/2008 | Haghighat et al. |
| 2008/0232307 A1 | 9/2008 | Pi et al. |
| 2008/0253469 A1 | 10/2008 | Ma et al. |
| 2008/0267158 A1 | 10/2008 | Zhang et al. |
| 2008/0304593 A1 | 12/2008 | Khan et al. |
| 2008/0310483 A1 | 12/2008 | Lee et al. |
| 2009/0046793 A1 | 2/2009 | Love et al. |
| 2009/0059884 A1 | 3/2009 | Zhang et al. |
| 2009/0060081 A1 | 3/2009 | Zhang et al. |
| 2009/0154580 A1 | 6/2009 | Ahn et al. |
| 2009/0196279 A1 | 8/2009 | Kim et al. |
| 2009/0274037 A1 | 11/2009 | Lee et al. |
| 2009/0285163 A1 | 11/2009 | Zhang et al. |
| 2009/0310719 A1 | 12/2009 | Stirling-gallacher |
| 2009/0323615 A1 | 12/2009 | Ihm et al. |
| 2010/0034163 A1 | 2/2010 | Damnjanovic et al. |
| 2010/0098005 A1 | 4/2010 | Lee et al. |
| 2010/0260164 A1 | 10/2010 | Moon et al. |
| 2010/0316148 A1 | 12/2010 | Lee et al. |
| 2011/0002309 A1 | 1/2011 | Park et al. |
| 2011/0249705 A1 | 10/2011 | Lee et al. |
| 2012/0106478 A1 | 5/2012 | Han et al. |
| 2012/0113945 A1 | 5/2012 | Moon et al. |
| 2013/0148698 A1 | 6/2013 | Lee et al. |
| 2013/0294282 A1 | 11/2013 | Seo |

FOREIGN PATENT DOCUMENTS

| | | |
|---|---|---|
| EP | 1248485 | 10/2002 |
| EP | 1746810 | 1/2007 |
| EP | 1746855 | 1/2007 |
| JP | 04-074026 | 3/1992 |
| JP | 2001044900 | 2/2001 |
| JP | 2002369258 | 12/2002 |
| JP | 2004-312291 | 11/2004 |
| JP | 2004364321 | 12/2004 |
| JP | 2005244960 | 9/2005 |
| JP | 2005253073 | 9/2005 |
| JP | 2005288300 | 10/2005 |
| JP | 2006166382 | 6/2006 |
| JP | 2007-124682 | 5/2007 |
| JP | 2007-511975 | 5/2007 |
| JP | 2007-221755 | 8/2007 |
| JP | 2008-053858 | 3/2008 |
| JP | 2008-092377 | 4/2008 |
| JP | 2008092051 | 4/2008 |
| JP | 2008236018 | 10/2008 |
| JP | 2010506505 | 2/2010 |
| JP | 2011193521 | 9/2011 |
| KR | 101999013366 | 2/1999 |
| KR | 10-2002-0009079 | 2/2002 |
| KR | 1020020088085 | 11/2002 |
| KR | 1020030081464 | 10/2003 |
| KR | 1020050021965 | 3/2005 |
| KR | 10-2005-0043302 | 5/2005 |
| KR | 1020050073256 | 7/2005 |
| KR | 10-2005-0120244 | 12/2005 |
| KR | 1020060016600 | 2/2006 |
| KR | 10-2006-0081352 | 7/2006 |
| KR | 10-2006-0092055 | 8/2006 |
| KR | 1020060095576 | 8/2006 |
| KR | 1020070107614 | 11/2007 |
| KR | 10-2008-0023664 | 3/2008 |
| KR | 1020080030905 | 4/2008 |
| KR | 1020080039772 | 5/2008 |
| KR | 10-2008-0065853 | 7/2008 |
| KR | 10-2008-0096088 | 10/2008 |
| KR | 10-0894142 | 4/2009 |
| KR | 10-2009-0082843 | 7/2009 |
| RU | 2142672 | 10/1999 |
| RU | 2221335 | 1/2004 |
| RU | 2267225 | 5/2005 |
| TW | 545074 | 8/2003 |
| WO | 03/043245 | 5/2003 |
| WO | 03/077579 | 9/2003 |
| WO | 03/085858 | 10/2003 |
| WO | 2004/038991 | 5/2004 |
| WO | 2004/049591 | 6/2004 |
| WO | 2005/006250 | 1/2005 |
| WO | 2005/050875 | 6/2005 |
| WO | 2005/060132 | 6/2005 |
| WO | 2005/065062 | 7/2005 |
| WO | 2005/074184 | 8/2005 |
| WO | 2005099123 | 10/2005 |
| WO | 2005119959 | 12/2005 |
| WO | 2005125140 | 12/2005 |

(56) References Cited

FOREIGN PATENT DOCUMENTS

| WO | 2006/023192 | 3/2006 |
|---|---|---|
| WO | 2006/069299 | 6/2006 |
| WO | 2006/071050 | 7/2006 |
| WO | 2006/073284 | 7/2006 |
| WO | 2006/102771 | 10/2006 |
| WO | 2007/011180 | 1/2007 |
| WO | 2007007380 | 1/2007 |
| WO | 2007/052941 | 5/2007 |
| WO | 2007049208 | 5/2007 |
| WO | 2007/078146 | 7/2007 |
| WO | 2008041819 | 4/2008 |
| WO | 2008/133439 | 11/2008 |
| WO | 2008/153331 | 12/2008 |
| WO | 2009/041785 | 4/2009 |

OTHER PUBLICATIONS

United States Patent and Trademark Office U.S. Appl. No. 13/295,974 Office Action dated Jan. 29, 2013, 8 pages.
United States Patent and Trademark Office U.S. Appl. No. 13/295,884, Office Action dated Mar. 14, 2013, 8 pages.
United States Patent and Trademark Office U.S. Appl. No. 13/165,711, Office Action dated Mar. 13, 2013, 10 pages.
United States Patent and Trademark Office U.S. Appl. No. 13/217,204, Notice of Allowance dated Apr. 8, 2013, 8 pages.
United States Patent and Trademark Office U.S. Appl. No. 13/014,665, Final Office Action dated May 22, 2013, 25 pages.
Taiwan Intellectual Property Office Application Serial No. 096136988, Office Action dated May 17, 2013, 6 pages.
United States Patent and Trademark Office U.S. Appl. No. 13/165,711, Final Office Action dated Aug. 9, 2013, 9 pages.
NTT DoCoMo et al., "Downlink L1/L2 Control Signaling Channel Structure Mapping," R1-070104, 3GPP TSG RAN WG Meeting #47bis, Jan. 2007, 17 pages.
Ericsson et al., "Way Forward on Downlink Control Signaling," R1-071223, 3GPP TSG RAN WG1 Meeting #48, Feb. 2007, 6 pages.
NEC Group, "Efficient Downlink ACK/NACK signalling for E-UTRA," R1-071508, TSG-RAN WG1#48Bis, Mar. 2007, 3 pages.
Huawei, "E-UTRA Downlink L1/L2 Control Channel Structure," R1-071689, 3GPP TSG-RAN-WG1 Meeting #48bis, Mar. 2007, 4 pages.
Nortel, "SCH Search Performance with Transmit Diversity", R1-061843, 3GPP TSG-RAN Working Group 1 Meeting on LTE, Jun. 2006, 10 pages.
Samsung, "Performance of 4-Tx Antenna diversity with realistic channel estimation", R1-072239, 3GPP TSG RAN WG1 Meeting #49, May 2007, 6 pages.
Morimoto et al., "Transmit Diversity Schemes Suitable for Common Control Channel in Evolved UTRA Downlink", RCS2007-50, IEICE Technical Report, pp. 125-130, Jul. 2007.
Samsung, "Downlink ACK/NACK Transmission Structure", R1-072247, 3GPP TSG RAN WG1 Meeting #49, May 2007, 4 pages.
Panasonic, "Mapping Positions of Control Channel for Uplink SC-FDMA", TSG-RAN WG1 #43, Doc. No. R1-051395, XP-002450961, Nov. 7, 2005, 6 pages.
3rd Generation Partnership Project (3GPP), "3rd Generation Partnership Project; Technical Specification Group Radio Access Network; LTE Physical Layer—General Description (Release 8)" 3GPP TS 36.201 V1.2.0, XP-050380347, Jun. 2007, 12 pages.
Su, W., et al., "Obtaining full-diversity space-frequency codes from space-time codes via mapping," IEEE Transactions on Signal Processing, vol. 51, No. 11, pp. 2905-2916, Nov. 1, 2003; XP-011102805.
Samsung, "Transmit Diversity for 4-Tx Antenna", 3GPP TSG RAN WG1 Meeting #49, R1-072238, May 7, 2007, XP-002578959, 5 pages.
Zhang, W., et al., "Space-Time/Frequency Coding for MIMO-OFDM in Next Generation Broadband Wireless Systems," Next-Generation CDMA vs. OFDMA for 4G Wireless Applications, IEEE Wireless Communications, vol. 14, No. 3, pp. 32-43, Jun. 2007, XP-011189164.
Kim, I.G., et al., "Transmit Diversity and Multiplexing Methods for 3G-LTE Downlink Control Channels," 64th IEEE Vehicular Technology Conference, Sep. 2006, XP-031051218, 4 pages.
Heung, et al., "System Design and analysis SFBC CI-OFDM system against the nonlinear distortion and narrow interference", IEEE Transaction on Consumer Electronics, vol. 54, issue 2, May 2008, pp. 368-375.
Heung, et al., "Design and Performance Evaluation of the MIMO SFBC CI-OFDM Communication System", Fourth International Conference on Wireless and Mobile comm., 2008, pp. 60-64.
Wei Zhang, et al., "Universal Space-Frequency Block Coding for MIMO-OFDM System", IEEE Asia Pacific Conference on Communcations, Oct. 2005, pp. 227-231.
Ming Zhang, et al., "Space-Frequency Block Code with Matched Rotation MIMO-OFDM System with Limited Feedback", EURASIP Journal on Advance Signal Processing Publication, Jun. 24, 2009, 31 pages.
NTT DoCoMo et al., "Coding Scheme of L1/L2 Control Channel for E-UTRA Downlink", R1-061672, 3GPP TSG RAN WG1 LTE Ad Hoc, Jun. 2006, 19 pages.
Sharp, "UE Identity in L1/L2 Downlink Control Signalling", R1-061136, 3GPP TSG-RAN WG1#45, May 2006, 7 pages.
LG Electronics, "Downlink control signaling", R1-063177, 3GPP TSG RAN WG1 #47, Nov. 2006, 6 pages.
LG Electronics, "DL ACK/NACK structure", R1-072878, 3GPP TSG RAN WG1 #49bis, Jun. 2007, 6 pages.
Ryu, et al., "System Design and Analysis SFBC CI-OFDM System Against the Nonlinear Distortion and Narrowband Interference," IEEE Transactions on Consumer Electronics, vol. 54, Issue 2, pp. 368-375, May 2008.
Ryu, H.G., "Design and Performance Evaluation of the MIMO SFBC CI-OFDM Communication System," Fourth Int'l Conference on Wireless and Mobile Communications, pp. 60-64, Oct. 2008.
Intel Corporation: "Text Proposal for downlink OFDMA resource allocation and mapping rules for distributed mode users in E-UTRA, with discussion on control information", R1-061149, 3GPP TSG RAN WG1 #45, May 2006, XP002486595, 7 pages.
ETRI: "Downlink L1/L2 control signaling", R1-070079, 3GPP TSG RAN WG1 Meeting #47bis, Jan. 2007, XP050104134, 10 pages.
Qualcomm Europe, "Mapping of UL ACK Transmission based on DL VRB", R1-070660, 3GPP TSG RAN1 #48, Feb. 2007, 4 pages.
Nortel, "Discussion on linkage of PHICH to uplink transmissions", R1-080771, 3GPP TSG-RAN WG1 Meeting #52, Feb. 2007, 3 pages.
Kaiser, "Space Frequency Block Coding in the Uplink of Broadband MC-CDMA Mobile Radio Systems with Pre-Equalization", Institute of Electrical and Electronics Engineers, Vehicular Technology Conference, Fall 2003, XP10701084, 6 pages.
Texas Instruments, "Shared Control Channel Structure and Coding for E-UTRA Downlink", 3GPP TSG RAN WG1 LTE Ad Hoc, R1-061740, Jun. 2006, 8 pages.
LG Electronics, "Downlink Cat0 signaling for scheduling assignments", 3GPP TSG RAN WG1 #47bis, R1-070247, Jan. 2007, 4 pages.
LG Electronics, "Downlink ACK/NACK Index Mapping", R1-071552, 3GPP RAN WG1 #48-BIS, Mar. 2007, XP-002660818, 6 pages.
Qualcomm Europe, "Considerations on Multiplexing of Control and User Data for xFDMA based E-UTRA Uplink Evaluation", R1-051102, 3GPP TSG-RAN WG1 #42bis, Oct. 2005, XP-0024466386, 6 pages.
LG Electronics, "Uplink ACK/NACK Index Mapping", R1-071547, 3GPP RAN WG1 #48-BIS, Mar. 2007, XP-002660822, 6 pages.
Panasonic, "Assignment of Downlink ACK/NACK channel", R1-072794, 3GPP TSG-RAN WG1 Meeting #49bis, Jun. 2007, XP-002660823, 4 pages.
NTT DoCoMo, et al., "RB-Level Distributed Transmission method for Shared Data Channel in E-UTRA Downlink", 3GPP TSG RAN WG1 Meeting #46, R1-062285, Aug. 2006, 3 pages.

(56) References Cited

OTHER PUBLICATIONS

Texas Instruments, "Shared Control Channel Structure for E-UTRA Downlink", 3GPP TSG RAN WG1#45, R1-061433, May 2006, 5 pages.

United States Patent and Trademark Office U.S. Appl. No. 13/014,665, Office Action dated Nov. 29, 2012, 24 pages.

NTT DoCoMo et al., "Comparison between RB-level and Sub-carrier-level Distributed Transmission for Shared Data Channel in E-UTRA Downlink", R1-062089, 3GPP TSG RAN WG1 Meeting #46, Sep. 2006, 14 pages.

United States Patent and Trademark Office U.S. Appl. No. 13/014,665, Office Action dated Feb. 13, 2014, 18 pages.

United States Patent and Trademark Office U.S. Appl. No. 13/941,277, Notice of Allowance dated Jan. 21, 2014, 9 pages.

European Patent Office Application Serial No. 13185491.1, Search Report dated Nov. 7, 2013, 8 pages.

Motorola, "E-UTRA Downlink Control Channel Structure and TP," 3GPP TSG RAN1 #44, R1-060378, Feb. 2006, 7 pages.

Ericsson, et al., "DL Control Channel Structure," 3GPP Draft, R1-071820, Apr. 2007, 3 pages.

Panasonic, "CCE aggregation size and transport format signaling," 3GPP TSG-RAN WG1 Meeting #50, R1-073608, Aug. 2007, 8 pages.

LG Electronics, "Consideration on the amount of control channel overhead in downlink," 3GPP TSG RAN WG1 #49, R1-072353, May 2007, 5 pages.

Motorola, "Downlink Acknowledgment and Group Transmit Indicator Channels," 3GPP TSG RAN1 #45, R1-061165, May 2006, 4 pages.

Samsung, "DL ACK/NACK signalling," 3GPP RAN WG1 LTE Ad Hoc, R1-061697, Jun. 2006, 5 pages.

Via Telecom, "Hybrid CDM/TDM Structure for UL E-DCH," 3GPP TSG-RAN WG1 #38-bis, R1-041162, Sep. 2004, 3 pages.

European Patent Office Application Serial No. 07833138.6, Search Report dated Feb. 21, 2014, 10 pages.

European Patent Office Application Serial No. 07833139.4, Search Report dated Mar. 4, 2014, 7 pages.

NTT DoCoMo, et al., "ACK/NACK Signal Structure in E-UTRA Downlink," 3GPP TSG RAN WG1 Meeting #48, R1-070867, Feb. 2007, 3 pages.

LG Electronics, "Allocation of UL ACK/NACK index," 3GPP TSG RAN WG1 #49, R1-072348, May 2007, 4 pages.

European Patent Office Application Serial No. 14152103.9, Search Report dated Mar. 6, 2014, 7 pages.

Samsung, "Rules for mapping VRBs to PRBs," 3GPP RAN WG1 Meeting #44bis, R1-060808, Mar. 2006, 5 pages.

Ericsson, et al., "E-UTRA Downlink Control Signaling—Overhead Assessment," TSG-RAN WG1 #44, R1-060573, Feb. 2006, 7 pages.

FIG. 2

| | | | | | | | |
|---|---|---|---|---|---|---|---|
| Ant.1 | $f_1(a_1+b_1+c_1+d_1)$ | $f_2(a_2+b_2+c_2+d_2)$ | | | $f_1(e_1+f_1+g_1+h_1)$ | $f_2(e_2+f_2+g_2+h_2)$ | |
| Ant.2 | $f_3(a_2+b_2+c_2+d_2)$ | $f_4(a_1+b_1+c_1+d_1)$ | | | $f_3(e_2+f_2+g_2+h_2)$ | $f_4(e_1+f_1+g_1+h_1)$ | |
| Ant.3 | | | $f_1(a_3+b_3+c_3+d_3)$ | $f_2(a_4+b_4+c_4+d_4)$ | | | $f_1(e_3+f_3+g_3+h_3)$ | $f_2(e_4+f_4+g_4+h_4)$ |
| Ant.4 | | | $f_3(a_4+b_4+c_4+d_4)$ | $f_4(a_3+b_3+c_3+d_3)$ | | | $f_3(e_4+f_4+g_4+h_4)$ | $f_4(e_3+f_3+g_3+h_3)$ | frequency →

| | | | | | | | |
|---|---|---|---|---|---|---|---|
| Ant.1 | $f_1(a_1+b_1)$ | $f_2(a_2+b_2)$ | $f_1(c_1+d_1)$ | $f_2(c_2+d_2)$ | | | |
| Ant.2 | $f_3(a_2+b_2)$ | $f_4(a_1+b_1)$ | $f_3(c_2+d_2)$ | $f_4(c_1+d_1)$ | | | |
| Ant.3 | | | | | $f_1(e_1+f_1)$ | $f_2(e_2+f_2)$ | $f_1(g_1+h_1)$ | $f_2(g_2+h_2)$ |
| Ant.4 | | | | | $f_3(e_2+f_2)$ | $f_4(e_1+f_1)$ | $f_3(g_2+h_2)$ | $f_4(g_1+h_1)$ | frequency →

(b)

| | | | | | | | |
|---|---|---|---|---|---|---|---|
| Ant.1 | $f_1(a_1+b_1)$ | $f_2(a_2+b_2)$ | $f_1(c_1+d_1)$ | $f_2(c_2+d_2)$ | | | |
| Ant.2 | $f_3(a_2+b_2)$ | $f_4(a_1+b_1)$ | $f_3(c_2+d_2)$ | $f_4(c_1+d_1)$ | | | |
| Ant.3 | | | | | $f_1(a_1+b_1)$ | $f_2(a_2+b_2)$ | $f_1(c_1+d_1)$ | $f_2(c_2+d_2)$ |
| Ant.4 | | | | | $f_3(a_2+b_2)$ | $f_4(a_1+b_1)$ | $f_3(c_2+d_2)$ | $f_4(c_1+d_1)$ | frequency →

| Ant.1 | $f_1(a_1+b_1)$ | $f_2(a_2+b_2)$ | $f_1(c_1+d_1)$ | $f_2(c_2+d_2)$ | | | $f_1(e_1+f_1)$ | $f_2(e_2+f_2)$ | $f_1(g_1+h_1)$ | $f_2(g_2+h_2)$ |
| Ant.2 | | | | | | | | | | |
| Ant.3 | $f_3(a_2+b_2)$ | $f_4(a_1+b_1)$ | $f_3(c_2+d_2)$ | $f_4(c_1+d_1)$ | | | $f_3(e_2+f_2)$ | $f_4(e_1+f_1)$ | $f_3(g_2+h_2)$ | $f_4(g_1+h_1)$ |
| Ant.4 | | | | | | | | | | | frequency →

(b)

| Ant.1 | $f_1(a_1+b_1)$ | $f_2(a_2+b_2)$ | $f_1(c_1+d_1)$ | $f_2(c_2+d_2)$ | | | $f_1(a_1+b_1)$ | $f_2(a_2+b_2)$ | $f_1(c_1+d_1)$ | $f_2(c_2+d_2)$ |
| Ant.2 | | | | | | | | | | |
| Ant.3 | $f_3(a_2+b_2)$ | $f_4(a_1+b_1)$ | $f_3(c_2+d_2)$ | $f_4(c_1+d_1)$ | | | $f_3(a_2+b_2)$ | $f_4(a_1+b_1)$ | $f_3(c_2+d_2)$ | $f_4(c_1+d_1)$ |
| Ant.4 | | | | | | | | | | | frequency →

| | | | | |
|---|---|---|---|---|
| Ant.1 | $f_1(a_1+b_1+c_1+d_1)$ | $f_3(a_2+b_2+c_2+d_2)$ | $f_1(a_3+b_3+c_3+d_3)$ | $f_2(a_4+b_4+c_4+d_4)$ |
| Ant.2 | $f_3(a_2+b_2+c_2+d_2)$ | $f_4(a_1+b_1+c_1+d_1)$ | $f_2(a_4+b_4+c_4+d_4)$ | $f_4(a_3+b_3+c_3+d_3)$ | frequency →

(b)

| | | | | |
|---|---|---|---|---|
| Ant.1 | $f_1(a_1+b_1)$ | $f_2(a_2+b_2)$ | $f_1(c_1+d_1)$ | $f_2(c_2+d_2)$ |
| Ant.2 | $f_3(a_2+b_2)$ | $f_4(a_1+b_1)$ | $f_3(c_2+d_2)$ | $f_4(c_1+d_1)$ | frequency →

FIG. 8

(a) Ant.1 frequency → $(a_1+b_1+c_1+d_1)$ $(a_2+b_2+c_2+d_2)$ $(a_3+b_3+c_3+d_3)$ $(a_4+b_4+c_4+d_4)$ (b) Ant.1 frequency → $(a_1+b_1)$ $(a_2+b_2)$ $(c_1+d_1)$ $(c_2+d_2)$

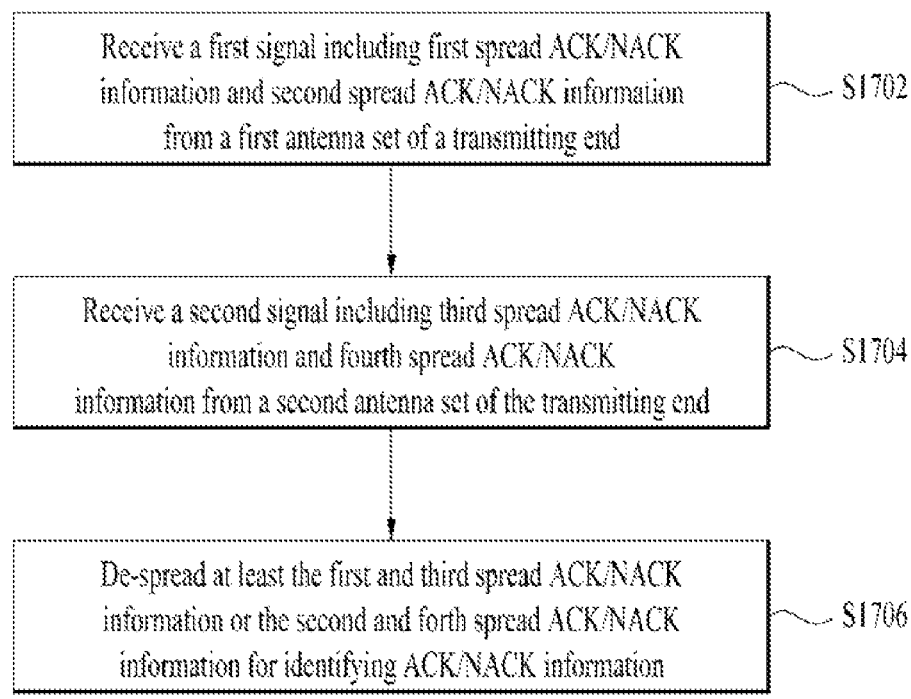

TRANSMITTING SPREAD SIGNAL IN COMMUNICATION SYSTEM

CROSS-REFERENCE TO RELATED APPLICATIONS

This application is a continuation of U.S. patent application Ser. No. 13/757,700, filed on Feb. 1, 2013, now U.S. Pat. No. 8,582,626, which is a continuation of U.S. patent application Ser. No. 13/166,750, filed on Jun. 22, 2011, now U.S. Pat. No. 8,369,378, which is a continuation of U.S. patent application Ser. No. 12/139,261, filed on Jun. 13, 2008, now U.S. Pat. No. 8,009,720, which pursuant to 35 U.S.C. § 119, claims the benefit of earlier filing date and right of priority to Korean Application No. 10-2008-0007935, filed on Jan. 25, 2008, and also claims the benefit of U.S. Provisional Application Ser. Nos. 60/943,783, filed on Jun. 13, 2007, 60/955,019, filed on Aug. 9, 2007, 60/976,487, filed on Oct. 1, 2007, 60/982,435, filed on Oct. 25, 2007, and 60/983,234, filed on Oct. 29, 2007, the contents of which are all hereby incorporated by reference herein in their entirety.

FIELD OF THE INVENTION

The present invention relates to a mobile communication system, and more particularly, to transmitting a spread signal in a mobile communication system.

BACKGROUND OF THE INVENTION

Recently, the demand for wireless communication services has risen abruptly due to the generalization of information communication services, the advent of various multimedia services and the appearance of high-quality services. To actively cope with the demand, a communication system's capacity should first be increased. In order to do so, methods for finding new available frequency bands and raising the efficiency of given resources in wireless communication environments are considered.

Much effort and attention has been made to research and develop multi-antenna technology. Here, diversity gain is obtained by additionally securing a spatial area for resource utilization with a plurality of antennas provided to a transceiver or raising transmission capacity by transmitting data in parallel via each antenna.

An example of a multi-antenna technology is a multiple input multiple output (MIMO) scheme. The MIMO scheme indicates an antenna system having multiple inputs and outputs, raises a quantity of information by transmitting different information via each transmitting antenna, and enhances reliability of transport information using coding schemes such as STC (space-time coding), STBC (space-time block coding), SFBC (space-frequency block coding) and the like.

SUMMARY OF THE INVENTION

The present invention is directed to transmitting a spread signal in a mobile communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for transmitting a spread signal in a mobile communication system, the method comprising spreading a first signal using a plurality of spreading codes, wherein the plurality of spreading codes have a spreading factor, multiplexing the first spread signal by code division multiplexing, transmitting the first multiplexed signal via a plurality of neighboring frequency resources of an OFDM symbol of a first antenna set, spreading a second signal using a plurality of spreading codes, wherein the plurality of spreading codes have a spreading factor, multiplexing the second spread signal by code division multiplexing, transmitting the second multiplexed signal via a plurality of neighboring frequency resources of the OFDM symbol of the first antenna set, transmitting the first multiplexed signal via a plurality of neighboring frequency resources of an OFDM symbol of a second antenna set, and transmitting the second multiplexed signal via a plurality of neighboring frequency resources of the OFDM symbol of the second antenna set, wherein the first multiplexed signal is transmitted on frequency resources that neighbor frequency resources that the second multiplexed signal is transmitted on.

Preferably, the first multiplexed signal and second multiplexed signal are respectively transmitted on two neighboring frequency resources. Preferably, the spreading factor is 2.

In one aspect of the invention, the first antenna set is space frequency block coded by applying a space frequency block code to each neighboring pair of frequency resources of one OFDM symbol, wherein the first antenna set comprises two antennas. In another aspect of the invention, the second antenna set is space frequency block coded by applying a space frequency block code to each neighboring pair of frequency resources of one OFDM symbol, wherein the second antenna set comprises two antennas.

Preferably, the multiplexed signals transmitted via the first antenna set and the multiplexed signals transmitted via the second antenna set are transmitted via respectively different frequency resources. Preferably, the multiplexed signals transmitted via the first antenna set and the multiplexed signals transmitted via the second antenna set are transmitted via respectively different OFDM symbols.

In a further aspect of the invention, the first multiplexed signal and second multiplexed signal are transmitted alternately by the first antenna set and second antenna set via independent frequency resources repeatedly. Preferably, the first multiplexed signal and second multiplexed signal are transmitted a total of 3 times using the first antenna set and second antenna set alternately.

In one aspect of the invention, the first antenna set comprises a first antenna and a second antenna of a four-antenna group, and the second antenna set comprises a third antenna and a fourth antenna of the four-antenna group.

In another aspect of the invention, the first antenna set comprises a first antenna and a third antenna of a four-antenna group, and the second antenna set comprises a second antenna and a fourth antenna of the four-antenna group.

In a further aspect of the invention, the first antenna set and second antenna set respectively comprise one antenna.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 2 is a diagram explaining an example of a method for applying an SFBC/FSTD scheme to a spread signal in a mobile communication system in accordance with one embodiment of the present invention.

FIG. 3 is a diagram explaining an example of a transmission structure applicable for transmitting a spread signal in a mobile communication system in accordance with one embodiment of the present invention.

FIG. 4 is a diagram explaining another example of a transmission structure applicable for transmitting a spread signal in a mobile communication system in accordance with one embodiment of the present invention.

FIG. 5 is a diagram explaining another example of a transmission structure applicable for transmitting a spread signal in a mobile communication system in accordance with one embodiment of the present invention.

FIG. 6 is a diagram explaining another example of a transmission structure applicable for transmitting a spread signal in a mobile communication system in accordance with one embodiment of the present invention.

FIG. 7 is a diagram explaining another example of a transmission structure applicable for transmitting a spread signal in a mobile communication system in accordance with one embodiment of the present invention.

FIG. 8 is a diagram explaining a further example of a transmission structure applicable for transmitting a spread signal in a mobile communication system in accordance with one embodiment of the present invention.

FIG. 17 is a diagram explaining an example of a method for receiving ACK/NACK information in a mobile communication system in accordance with one embodiment of the present invention.

DETAILED DESCRIPTION OF THE PREFERRED EMBODIMENTS

Figure 1:
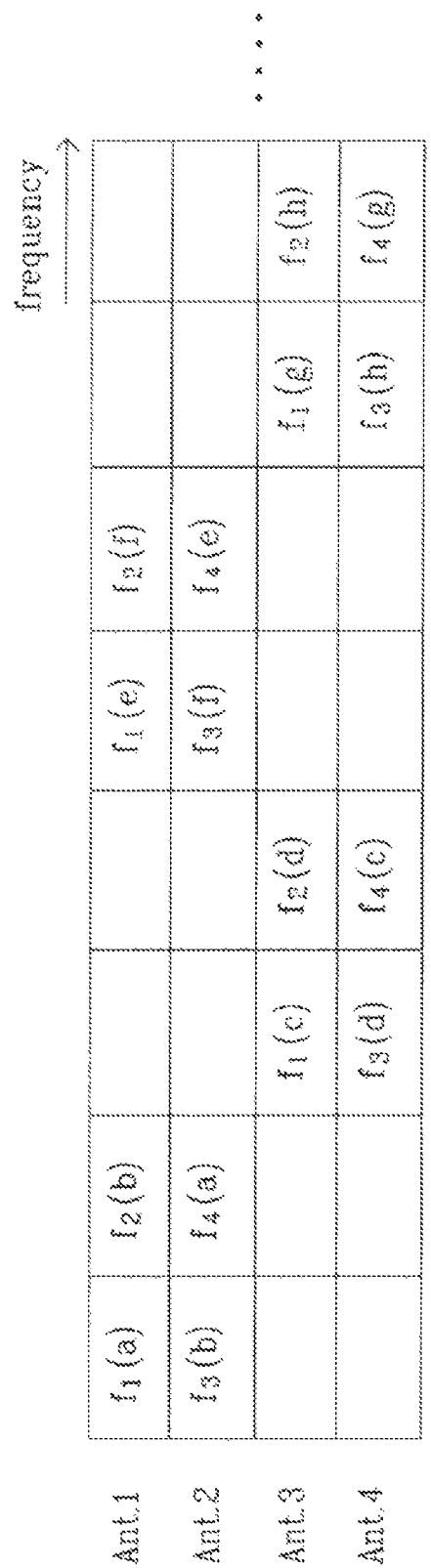
FIG. 1 is a diagram explaining an example of a method for applying an SFBC/FSTD scheme in a mobile communication system in accordance with one embodiment of the present invention.

The present invention relates to transmitting a spread signal in a wireless communication system.

Reference will now be made in detail to the preferred embodiments of the present invention, examples of which are illustrated in the accompanying drawings. It is to be understood that the following detailed description of the present invention is exemplary and explanatory and is intended to provide further explanation of the invention as claimed. The following detailed description includes details to provide complete understanding of the present invention. Yet, it is apparent to those skilled in the art that the present invention can be embodied without those details. For instance, predetermined terminologies are mainly used for the following description, need not to be limited, and may have the same meaning in case of being called arbitrary terminologies.

To avoid vagueness of the present invention, the structures or devices known in public are omitted or depicted as a block diagram and/or flowchart focused on core functions of the structures or devices. Wherever possible, the same reference numbers will be used throughout the drawings to refer to the same or like parts.

For the following embodiments, elements and features of the present invention are combined in prescribed forms. Each of the elements or features should be considered as selective unless there is separate and explicit mention. Each of the elements or features can be implemented without being combined with others. And, it is able to construct an embodiment of the present invention by combining partial elements and/or features of the present invention. The order of operations explained in the following embodiments of the present invention can be changed. Some partial configurations or features of a prescribed embodiment can be included in another embodiment and/or may be replaced by corresponding configurations or features of another embodiment.

In this disclosure, embodiments of the present invention are described mainly with reference to data transmitting and receiving relations between a base station and a terminal. In this case, the base station has a meaning of a terminal node of a network, which directly performs communication with the terminal. In this disclosure, a specific operation described as performed by a base station can be carried out by an upper node of the base station. Namely, it is understood that various operations carried out by a network, which includes a plurality of network nodes including a base station, for the communication with a terminal can be carried out by the base station or other network nodes except the base station. "Base station" can be replaced by such a terminology as a fixed station, Node B, eNode B (eNB), access point and the like. And, "terminal"

can be replaced by such a terminology as UE (user equipment), MS (mobile station), MSS (mobile subscriber station) and the like.

Furthermore, antenna and time/frequency resource for transmitting signals in a mobile communication system can be used in a manner of being defined as a prescribed transmission structure. In the following description, a transmission structure for antenna and frequency resource is explained by considering a case that SFBC (space frequency block coding) scheme is applicable. Yet, the same method can be available for a transmission structure for antenna and time resource. And, it is understood that STBC (space time block coding) scheme is applicable to the latter structure instead of SFBC.

FIG. 1 is a diagram explaining an example of a method for applying an SFBC/FSTD scheme in a mobile communication system, in accordance with one embodiment of the present invention. In FIG. 1, a method for obtaining 4-degree transmitting antenna diversity is implemented using a plurality of transmitting antennas, e.g., four downlink transmitting antennas of a communication system. Here, two modulation signals transmitted via two adjacent subcarriers are transmitted via a first antenna set including two antennas by having space frequency block coding (SFBC) applied thereto. Two SFBC-coded subcarrier sets are transmitted via two different antenna sets each including two different antennas by having frequency switching transmit diversity (FSTD) applied thereto. As a result, a transmitting antenna diversity degree 4 can be obtained.

Referring to FIG. 1, a single small box indicates a single subcarrier transmitted via a single antenna. The letters "a", "b", "c" and "d" represent modulation symbols modulated into signals differing from each other. Moreover, functions $f_1(x)$, $f_2(x)$, $f_3(x)$ and $f_4(x)$ indicate random SFBC functions that are applied to maintain orthogonality between two signals. These functions can be represented as in Formula 1.

$$f_1(x)=x, f_2(x)=x, f_3(x)=-x^*, f_4(x)=x^* \quad \text{[Formula 1]}$$

Despite two signals being simultaneously transmitted via two antennas through the random SFBC function applied to maintain orthogonality between the two signals, a receiving side may be able to obtain an original signal by decoding each of the two signals. In particular, FIG. 1 shows a structure that SFBC and FSTD transmitted in downlink within a random time unit is repeated. By applying a simple reception algorithm that the same SFBC decoding and FSTD decoding are repeated in a receiving side through the structure of SFBC and FSTD repeating transmissions, decoding complexity is reduced and decoding efficiency is raised.

In the example shown in FIG. 1, modulated symbol sets (a, b), (c, d), (e, f) and (g, h) become an SFBC-coded set, respectively. FIG. 1 shows that subcarriers having SFBC/FSTD applied thereto are consecutive. However, the subcarriers having SFBC/FSTD applied thereto may not necessarily be consecutive in a frequency domain. For instance, a subcarrier carrying a pilot signal can exist between SFBC/FSTD applied subcarriers. Yet, two subcarriers constructing an SFBC coded set are preferably adjacent to each other in a frequency domain so that wireless channel environments covered by a single antenna for two subcarriers can become similar to each other. Hence, when SFBC decoding is performed by a receiving side, it is able to minimize interference mutually affecting the two signals.

In accordance with one embodiment of the present invention, an SFBC/FSTD scheme may be applied to a spread signal sequence. In a manner of spreading a single signal into a plurality of subcarriers through (pseudo) orthogonal code in a downlink transmission, a plurality of spread signals may be transmitted by a code division multiplexing (CDM) scheme. In the following description, a signal sequence spread by a prescribed spreading factor is named a spread signal.

For example, when attempting to transmit different signals "a" and "b", if the two signals are to be CDM-transmitted by being spread by a spreading factor (SF) 2, the signal a and the signal b are transformed into spread signal sequences ($a \cdot c_{11}$, $a \cdot c_{21}$) and ($b \cdot c_{12}$, $bc_{22}$) using (pseudo) orthogonal spreading codes of two chip lengths ($c_{11}$, $c_{21}$) and ($c_{12}$, $c_{22}$), respectively. The spread signal sequences are modulated by adding $a \cdot c_{11} + b \cdot c_{12}$ and $a \cdot c_{21} + bc_{22}$ to two subcarriers, respectively. Namely, $a \cdot c_{11} + b \cdot c_{12}$ and $a \cdot c_{21} + bc_{22}$ become modulated symbols, respectively. For clarity and convenience, the spread signal sequence resulting from spreading the signal a by SF=N is denoted as $a_1, a_2, \ldots, a_N$. Furthermore, a plurality of spread signals can be multiplexed by code division multiplexing (CDM) and then transmitted.

FIG. 2 is a diagram explaining an example of a method for applying an SFBC/FSTD scheme to a spread signal in a mobile communication system, in accordance with one embodiment of the present invention. In order to decode a signal spread over a plurality of subcarriers by despreading in a receiving side, as mentioned in the foregoing description, it is preferable that each chip of a received spread signal sequence undergo a similar wireless channel response. In FIG. 2, four different signals a, b, c and d are spread by SF=4 and the spread signals are transmitted by SFBC/FSTD through four subcarriers explained in the foregoing description of FIG. 1. Assuming that the function explained for the example in Equation 1 is used as an SFBC function, a received signal in each subcarrier can be represented as in Formula 2.

Subcarrier 1: $h_1(a_1+b_1+c_1d_1)-h_2(a_2+b_2+c_2+d_2)^*$

Subcarrier 2: $h_1(a_2+b_2+c_2+d_2)+h_2(a_1+b_1+c_1+d_1)^*$

Subcarrier 3: $h_1(a_3+b_3+c_3+d_3)-h_2(a_4+b_4+c_4+d_4)^*$ $h_3(a_3+b_3+c_3+d_3)-h_4(a_4+b_4+c_4+d_4)^*$ Subcarrier 4: $h_1(a_4+b_4+c_4+d_4)+h_2(a_3+b_3+c_3+d_3)^*$ $h_3(a_4+b_4+c_4+d_4)+h_4(a_3+b_3+c_3+d_3)^*$ [Formula 2]

In Formula 2, $h_i$ indicates fading undergone by an $i^{th}$ antenna. Preferably, subcarriers of the same antenna undergo the same fading. A noise component added to a receiving side may be ignored. And, a single receiving antenna preferably exists. In this case, spread sequences obtained by a receiving side after completion of SFBC decoding and FSTD decoding can be represented as in Formula 3.

$(|h_1|^2+|h_2|^2) \cdot (a_1+b_1+c_1+d_1)$, $(|h_1|^2+|h_2|^2) \cdot (a_2+b_2+c_2+d_2)$, $(|h_3|^2+|h_4|^2) \cdot (a_3+b_3+c_3+d_3)$, $(|h_3|^2+|h_4|^2) \cdot (a_4+b_4+c_4+d_4)$ [Formula 3]

Here, in order to separate the spread sequence obtained by the receiving side from the signals b, c and d by despreading with a (pseudo) orthogonal code corresponding to the signal a for example, the wireless channel responses for the four chips is preferably the same. However, as can be observed from Formula 3, signals transmitted via different antenna sets by FSTD are $(|h_1|^2+|h_2|^2)$ and $(|h_3|^2+|h_4|^2)$ and provide results through different wireless channel responses, respectively. Thus, complete elimination of a different CDM-multiplexed signal during dispreading is not performed.

Figure 3:
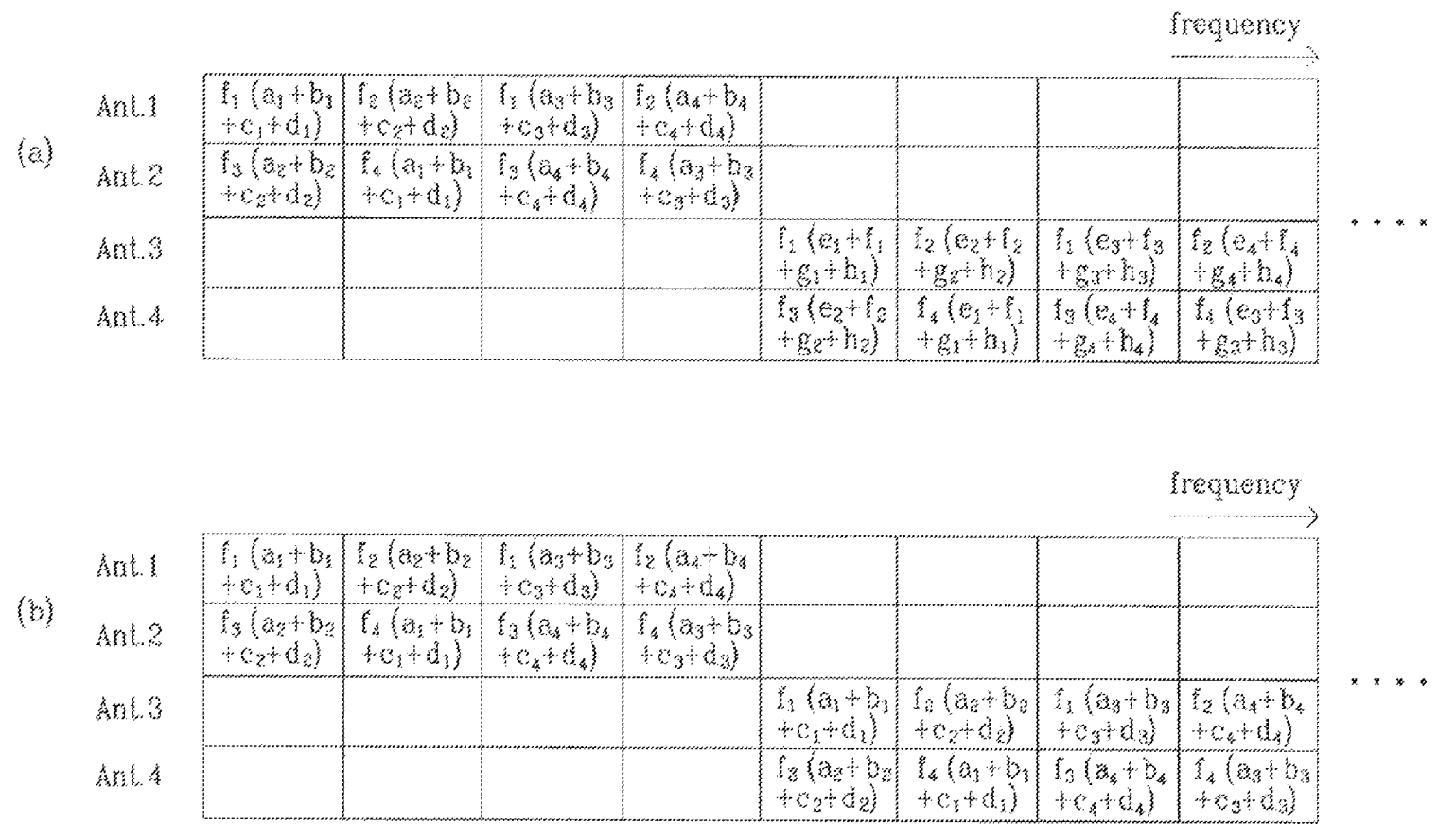

Therefore, one embodiment of the present invention is directed to a method of transmitting at least one spread signal in a communication system, wherein each of at least one signal is spread by (pseudo) orthogonal code or the like with a spreading factor (SF), and wherein the at least one spread signal is multiplexed by CDM and transmitted via the same antenna set. FIG. 3 is a diagram explaining an example of a method for applying an SFBC/FSTD scheme to a spread signal in a communication system in accordance with one embodiment of the present invention. In the present embodiment, each of at least one signal is spread by (pseudo) orthogonal code or the like with SF=4. Furthermore, the at least one spread signal is multiplexed and transmitted by CDM, and the multiplexed signals are transmitted via the same antenna set.

In FIG. 3, when a total of four transmitting antennas are used, a first antenna set includes a first antenna and a second antenna. A second antenna set includes a third antenna and a fourth antenna. In particular, each of the first and second antenna sets is the antenna set for performing SFBC coding, and an FSTD scheme is applicable between the two antenna sets. According to the present embodiment, assuming that data to be transmitted is carried by a single OFDM symbol, the signal spread with SF=4, as shown in FIG. 3, can be transmitted via four neighbor subcarriers of one OFDM symbol via the same SFBC-coded antenna set.

In FIG. 3($a$), shown is a case where the spread signal transmitted via the first antenna set is different from the spread signal transmitted via the second antenna set. In FIG. 3($b$), shown is a case where the spread signal transmitted via the first antenna set is repeatedly transmitted via the second antenna set to obtain a 4-degree transmitting antenna diversity gain.

Figure 4:
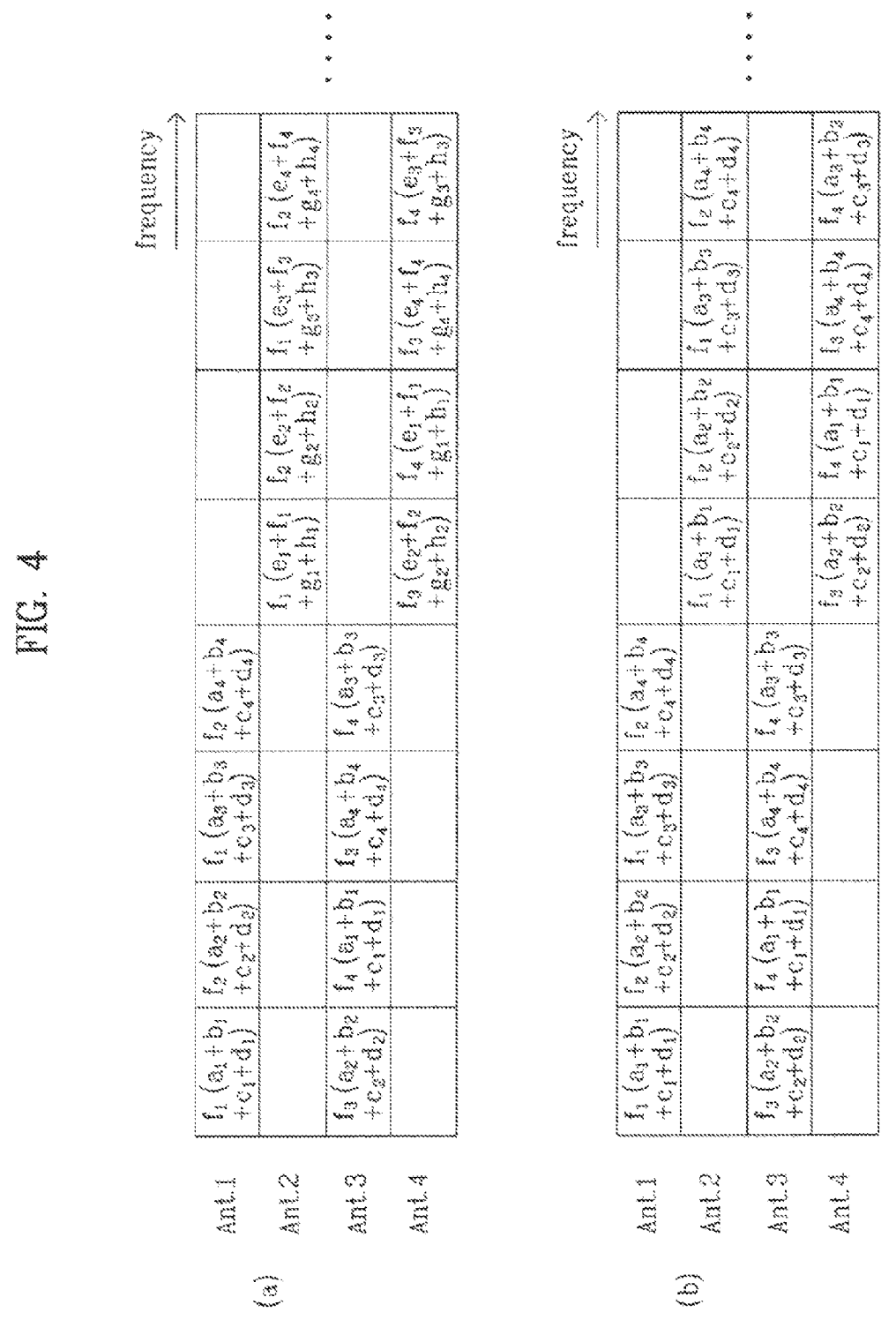

FIG. 4 is a diagram explaining another example for a method of applying an SFBC/FSTD scheme to a spread signal in a communication system in accordance with one embodiment of the present invention. In FIG. 4, like the embodiment shown in FIG. 3, each of at least one signal is spread by (pseudo) orthogonal code or the like with SF=4. The at least one spread signal is multiplexed and transmitted by CDM, and the multiplexed signals are transmitted via the same antenna set.

In FIG. 4, unlike FIG. 3, when a total of four transmitting antennas are used, a first antenna set includes a first antenna and a third antenna. A second antenna set includes a second antenna and a fourth antenna. Namely, compared to FIG. 3, FIG. 4 shows a case of using a different method for constructing each antenna set but applying the same SFBC/FSTD scheme. Here, according to the present embodiment, the signal spread with SF=4 can be transmitted via four neighbor subcarriers of one OFDM symbol via the same SFBC-coded antenna set.

In FIG. 4($a$), shown is a case where the spread signal transmitted via the first antenna set is different from the spread signal transmitted via the second antenna set. In FIG. 4($b$), shown is a case where the spread signal transmitted via the first antenna set is repeatedly transmitted via the second antenna set to obtain a 4-degree transmitting antenna diversity gain.

In accordance with one embodiment of the present invention, the same transmission structure may be applied for different spreading factors. Notably, a system can use various spreading factors by considering a transport channel status, a traveling speed of terminal, a communication environment and the like. According to the present embodiment, the same transmission structure may be used for the various spreading factors rather than separately using a specific transmission structure for a particular spreading factor. Moreover, according to the present embodiment, spread signals multiplexed by a CDM scheme to be transmitted via N subcarriers are applicable even if spread by any spreading factor M smaller than N, and do not necessarily need to be spread by the spreading factor N.

For example, the transmission structure corresponding to a case where the spreading factor is SF=4 is applicable to various spreading factors other than SF=4. Consequently, this lessens the complication of a system and prevents increased signaling due to a transmission structure varying according to a prescribed spreading factor.

FIG. 5 is a diagram explaining another example of a transmission structure applicable for transmitting a spread signal in a mobile communication system in accordance with one embodiment of the present invention. In FIG. 5, an example of a case using a total of four transmitting antennas is shown, wherein a first antenna set includes a first antenna and second antenna, and a second antenna set includes a third antenna and fourth antenna.

In particular, FIG. 5($a$) illustrates a case where the spread signal transmitted via the first antenna set is different from the spread signal transmitted via the second antenna set. FIG. 5($b$) illustrates a case where the spread signal transmitted via the first antenna set is repeatedly transmitted via the second antenna set. Here, as mentioned in the foregoing description, a 4-degree transmitting antenna diversity gain is obtained.

In the present embodiment, at least one signal is spread by (pseudo) orthogonal code or the like by SF=2. Moreover, the at least one signal is CDM-multiplexed and transmitted. Preferably, the present embodiment provides a method for transmitting the multiplexed signals according to the same transmission structure defined by SF=4.

Referring to FIG. 5, the spread signals CDM-multiplexed with four subcarriers by SF=2 can be transmitted via two subcarriers, respectively. By applying the same transmission structure shown in FIG. 3, an SFBC/FSTD transmission scheme can be applied to FIG. 5 by 4-neighbor subcarrier unit of FIG. 3. However, unlike FIG. 3, a signal can be transmitted via subcarrier in a manner that the CDM-multiplexed signal spread by SF=2 is transmitted by 2-subcarrier unit instead of the CDM-multiplexed signal spread by SF=4.

FIG. 6 is a diagram explaining another example of a transmission structure applicable for transmitting a spread signal in a mobile communication system in accordance with one embodiment of the present invention. FIG. 6 differs from FIG. 5 merely by the construction of the antenna set. Thus, the same method for transmitting a spread signal shown in FIG. 5 is applied to FIG. 6.

In FIG. 6, at least one signal is spread by (pseudo) orthogonal code or the like by SF=2. The at least one signal is CDM-multiplexed and transmitted. Moreover, the present embodiment provides a method for transmitting the multiplexed signals according to the same transmission structure defined by SF=4.

Referring to FIG. 6, the spread signals CDM-multiplexed with four subcarriers by SF=2 can be transmitted via two subcarriers, respectively. By applying the same transmission structure shown in FIG. 4, an SFBC/FSTD transmission scheme can be applied to FIG. 6 by 4-neighbor subcarrier unit of FIG. 4. However, unlike FIG. 4, a signal can be transmitted via subcarrier in a manner that the CDM-multiplexed signal spread by SF=2 is transmitted by 2-subcarrier unit instead of the CDM-multiplexed signal spread by SF=4.

Preferably, FIGS. 5 and 6 illustrate embodiments of the present invention applicable to any M or N that satisfies the equation M≤N. Preferably, the present embodiment is applicable to an SFBC transmission using two transmitting antennas or a transmission using a single transmitting antenna.

FIG. 7 is a diagram explaining another example of a transmission structure applicable for transmitting a spread signal in a mobile communication system in accordance with one embodiment of the present invention. In FIG. 7 an SFBC transmission using two transmitting antennas is shown. FIG. 7(a) illustrates a transmission structure for transmitting spread signals CDM-multiplexed with 4 subcarriers by SF=4 via four subcarriers. FIG. 7(b) illustrates a transmission structure for transmitting spread signals CDM-multiplexed with 4 subcarriers by SF=2 via two subcarriers each.

In FIG. 7(b), data is preferably carried by subcarriers in a manner that the CDM-multiplexed signals spread by SF=2 instead of the CDM-multiplexed signals spread by SF=4 are transmitted by 2-subcarrier unit each. This occurs even though the SFBC transmission scheme is applied by 4-neighbor subcarrier unit as in the transmission structure of FIG. 7(a), wherein the spread signals are spread by SF=4 according to the present embodiment.

FIG. 8 is a diagram explaining a further example of a transmission structure applicable for transmitting a spread signal in a mobile communication system in accordance with one embodiment of the present invention. In FIG. 8, a transmission uses a single transmitting antenna. FIG. 8(a) illustrates a transmission structure for transmitting spread signals CDM-multiplexed with 4 subcarriers by SF=4 via four subcarriers. FIG. 8(b) illustrates a transmission structure for transmitting spread signals CDM-multiplexed with 4 subcarriers by SF=2 via two subcarriers each.

In FIG. 8(b), data is preferably carried by subcarriers in a manner that the CDM-multiplexed signals spread by SF=2 instead of the CDM-multiplexed signals spread by SF=4 are transmitted by 2-subcarrier unit each. This occurs even though the SFBC transmission scheme is applied by 4-neighbor subcarrier unit as in the transmission structure of FIG. 8(a), wherein the spread signals are spread by SF=4 according to the present embodiment.

Preferably, FIGS. 7 and 8 illustrate embodiments of the present invention applicable to any M or N that satisfies the equation M≤N. Preferably, by applying the present embodiment to a system capable of using 1, 2 or 4 transmitting antennas selectively, it is advantageous for random CDM signals or CDM signal groups to be allocated to a consistent structure by N-subcarrier unit, e.g., 4-subcarrier unit.

In accordance with another embodiment of the present invention, a spread signal may be repetitively transmitted. Particularly, different subcarriers may be repeatedly transmitted at least one time on a frequency axis, i.e., for a period of the same time unit, such that a same signal is repeatedly transmitted to obtain additional diversity.

Figure 9:
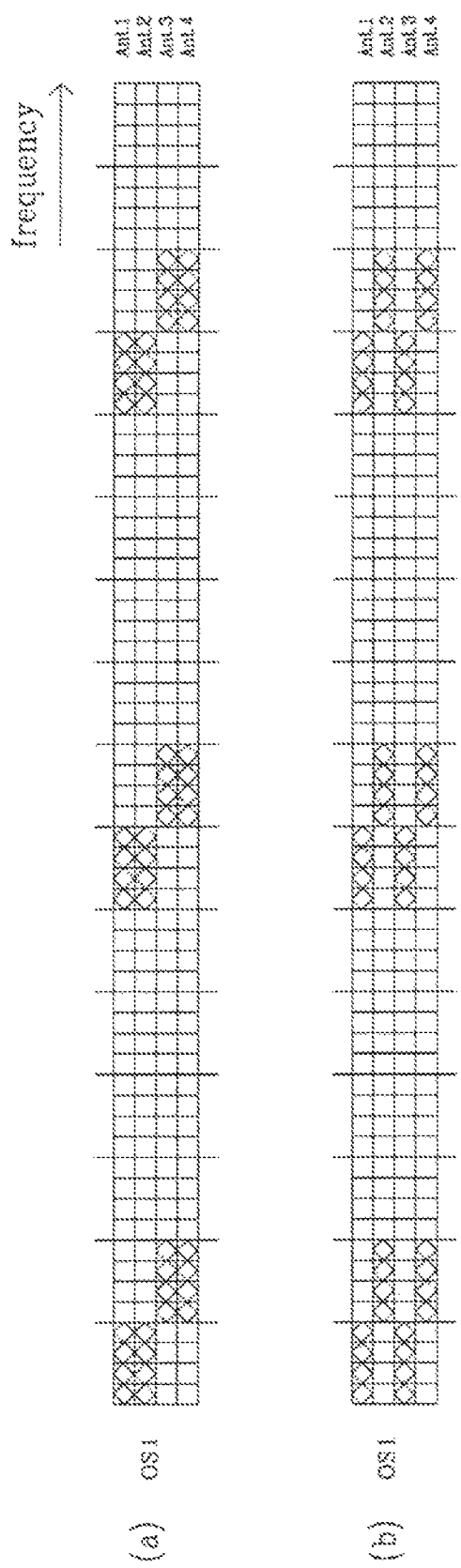
FIG. 9 is a diagram explaining an example of a transmission structure applicable for repeatedly transmitting a spread signal in a mobile communication system in accordance with one embodiment of the present invention.

FIG. 9 is a diagram explaining an example of a transmission structure applicable for repeatedly transmitting a spread signal in a mobile communication system in accordance with embodiment of the present invention. Referring to FIG. 9, an antenna-frequency mapping structure can be repeated with a prescribed number of subcarrier intervals. In particular, FIG. 9 illustrates a repetitive transmission by 8-subcarrier unit, for example. By applying the SFBC/FSTD scheme through the eight neighbor subcarriers, 4-degree transmission antenna diversity gain may be obtained. Preferably, the repetition unit constructed with eight subcarriers in FIG. 9 includes four subcarriers for carrying a spread signal spread by SF=4 via a first antenna set and four subcarriers for carrying a spread signal spread by SF=4 via a second antenna set.

Here, each of the spread signals may be a different signal or a repetitively transmitted signal. In case that each of the spread signals is a different signal, FIG. 9 shows that each spread signal is repeatedly transmitted three times. In case that each of the spread signals is a repetitively transmitted signal, FIG. 9 shows that each spread signal is repeatedly transmitted a total of six times. Moreover, if each of the spread signals is a different signal, space diversity gain can be obtained by applying antenna set mapping of a second repetition unit different from a first repetition unit.

Notably, FIGS. 9(a) and 9(b) differ from each other with regard to antenna construction of the first and second antenna sets. However, the present embodiment may be applied to FIGS. 9(a) and 9(b) in the same manner.

Figure 10:
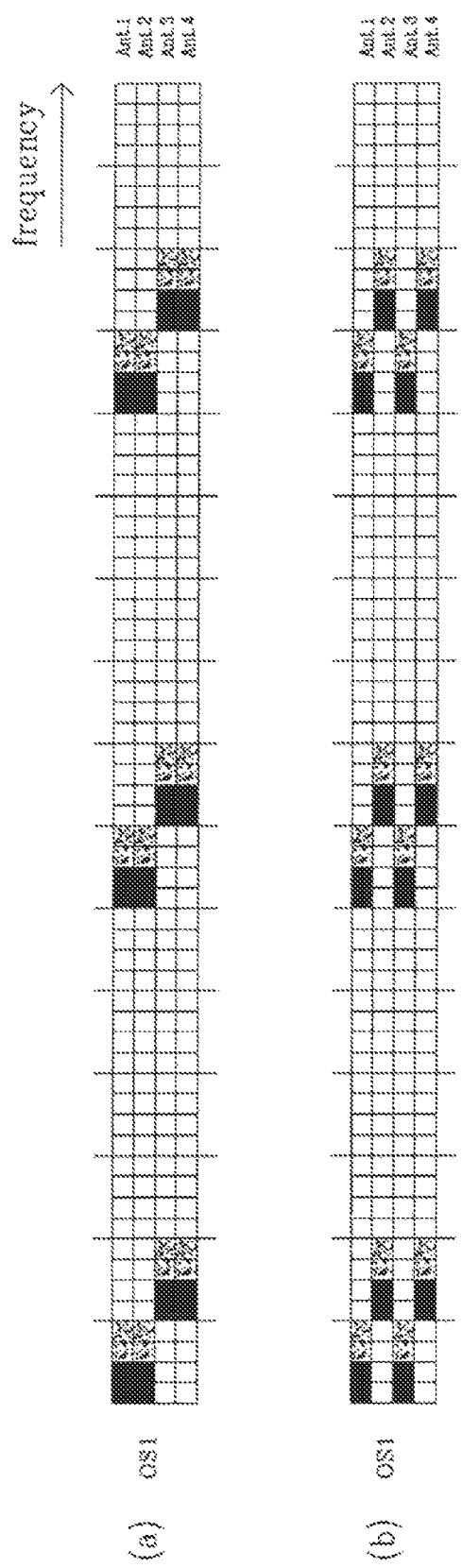
FIG. 10 is a diagram explaining another example of a transmission structure applicable for repeatedly transmitting a spread signal in a mobile communication system in accordance with one embodiment of the present invention.

FIG. 10 is a diagram explaining another example of a transmission structure applicable for repeatedly transmitting a spread signal in a mobile communication system in accordance with one embodiment of the present invention. FIG. 10 shows a method of transmitting a signal spread by SF=2 using the same transmission structure shown in FIG. 9.

Referring to FIG. 10, like FIG. 9, an antenna-frequency mapping structure can be repeated with a prescribed number of subcarrier intervals. In particular, FIG. 10 shows a repetitive transmission by 8-subcarrier unit, for example. By applying the SFBC/FSTD scheme through the eight neighbor subcarriers, a 4-degree transmission antenna diversity gain may be obtained.

In FIG. 10, two spread signals spread by SF=2 may be transmitted each using the same four subcarriers used to transmit a single spread signal spread by SF=4 in FIG. 9. In particular, the repetition unit constructed with eight subcarriers includes four subcarriers for carrying the two spread signals spread by SF=2 via the first antenna set and four subcarriers for carrying the spread signals spread by SF=2 each via the second antenna set according to the above-mentioned embodiment. Preferably, each of the spread signals may be a different signal or a repetitively transmitted signal. Moreover, antenna set mapping may be differently applied per repetition unit.

Notably, FIGS. 10(a) and 10(b) differ from each other with regard to antenna construction of the first and second antenna sets. However, the present embodiment may be applied to FIGS. 10(a) and 10(b) in the same manner.

In accordance with another embodiment of the present invention, allocated resources may be partially used according to a transmission structure. Particularly, allocated resources may be used partially according to a transmission structure instead of using all resources to transmit a spread signal according to a preset transmission structure.

Figure 11:
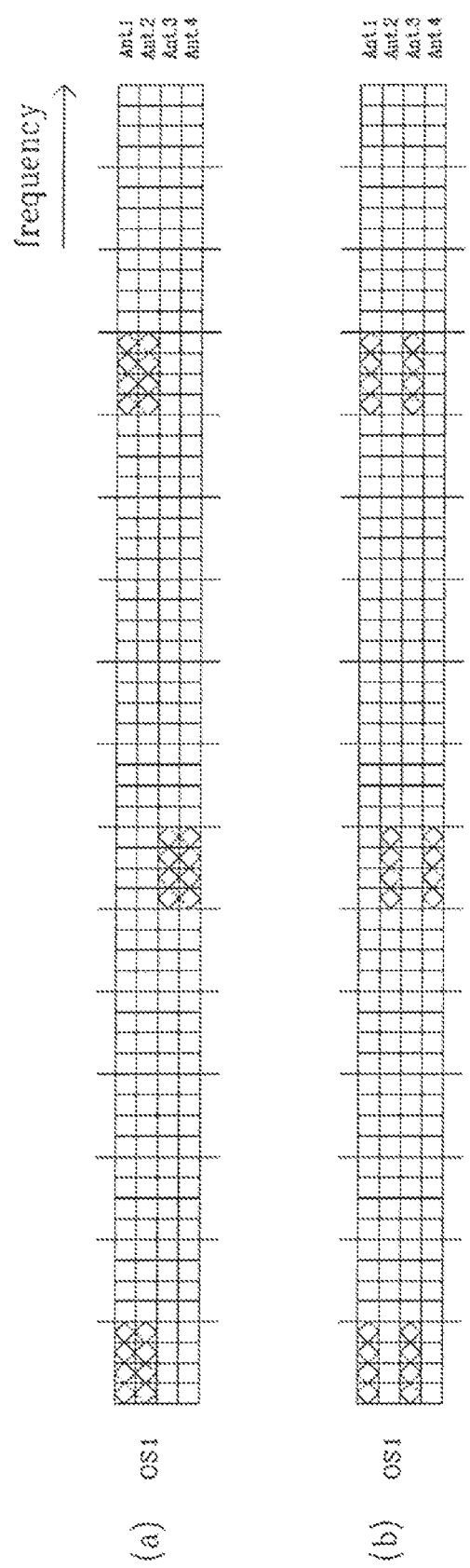
FIG. 11 is a diagram explaining an example of a transmission structure applicable for transmitting a spread signal in a mobile communication system in accordance with one embodiment of the present invention.

FIG. 11 is a diagram explaining an example of a transmission structure applicable for transmitting a spread signal in a mobile communication system in accordance with one embodiment of the present invention. In FIG. 11, a spread signal spread by SF=4 is transmitted, wherein an antenna set is determined by 4-subcarrier unit to enable a spread signal to be transmitted via the same antenna set.

Referring to FIG. 11, transmission may be performed using four of eight subcarriers allocated by a first repetition unit according to a transmission structure instead of using all allocated resources. Moreover, transmission may be performed using four of eight subcarriers allocated by a second repetition unit. In doing so, an antenna set different from that of a previous transmission may be used to implement an SFBC/FSTD scheme for obtaining 4-degree transmission antenna diversity. Preferably, as mentioned in the foregoing description, each of the repetition units is allocated to have a prescribed number of subcarrier intervals.

In accordance with the present embodiment, the repetition unit construction does not include eight neighbor subcarriers. Instead, four subcarriers include neighbor subcarriers, in which a prescribed number of subcarrier intervals are inserted. And, the rest of the subcarriers include neighbor subcarriers. Thus, frequency diversity in addition to 4-degree antenna diversity may be obtained.

In FIG. 11, four subcarriers each are configured to include neighbor subcarriers by considering an advantage that subcarriers carrying a single spread signal include subcarriers neighboring each other. Hence, the number of subcarriers including neighbor subcarriers can be freely modified according to the number of subcarriers used for spread signal transmission according to a spreading factor or other reasons, purposes or the like.

Notably, FIGS. 11(a) and 11(b) differ from each other with regard to antenna construction of the first and second antenna sets. However, the present embodiment may be applied to FIGS. 11(a) and 11(b) in the same manner.

Figure 12:
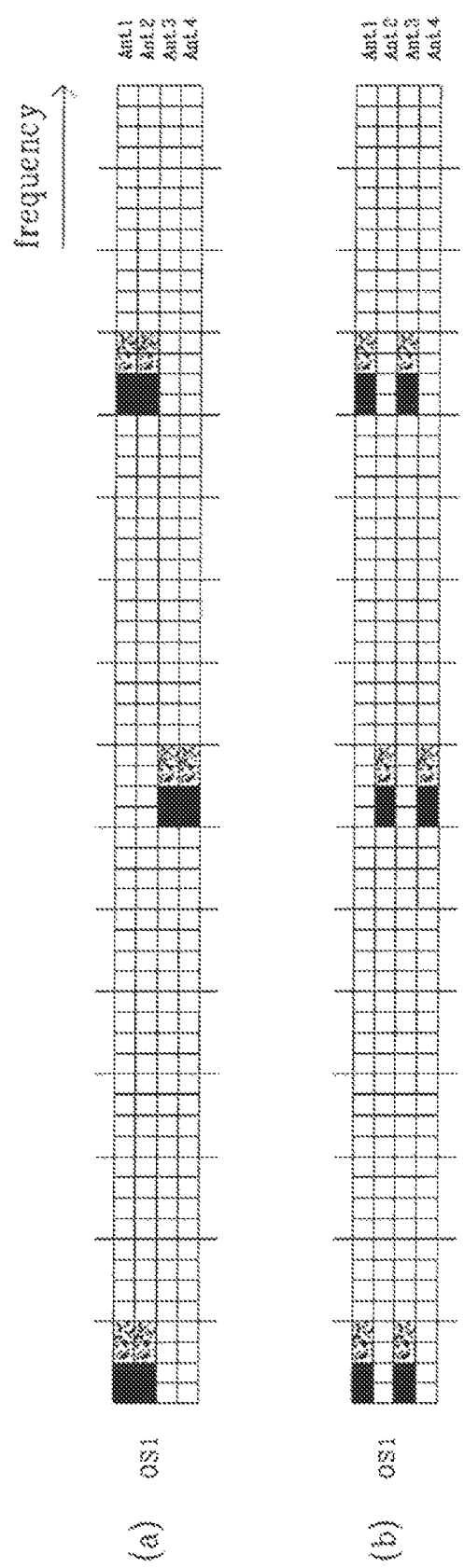
FIG. 12 is a diagram explaining another example of a transmission structure applicable for transmitting a spread signal in a mobile communication system in accordance with one embodiment of the present invention.

FIG. 12 is a diagram explaining another example of a transmission structure applicable for transmitting a spread signal in a mobile communication system in accordance with one embodiment of the present invention. FIG. 12 shows a method for transmitting a spread signal spread by SF=2 using the same transmission structure shown in FIG. 11.

Referring to FIG. 12, like FIG. 11, a transmission may be performed using four of eight subcarriers allocated by a first repetition unit according to a transmission structure instead of using all allocated resources. Moreover, a transmission may be performed using four of eight subcarriers allocated by a second repetition unit. In doing so, an antenna set different from that of a previous transmission may be used to implement an SFBC/FSTD scheme for obtaining 4-degree transmission antenna diversity. Preferably, as mentioned in the foregoing description, each of the repetition units is allocated to have a prescribed number of subcarrier intervals.

However, unlike the embodiment shown in FIG. 11, FIG. 12 illustrates transmitting a spread signal spread by SF=2, in which two spread signals spread by SF=2 can be transmitted using four subcarriers used to transmit a single spread signal spread by SF=4. Each of the spread signals may be a different signal or a repetitively transmitted signal. Moreover, antenna set mapping may be applied differently per repetition unit.

In accordance with the present embodiment, the repetition unit construction does not include eight neighbor subcarriers. Instead, four subcarriers include neighbor subcarriers, in which a prescribed number of subcarrier intervals are inserted. And, the rest of the subcarriers include neighbor subcarriers.

Notably, FIGS. 12(a) and 12(b) differ from each other with regard to antenna construction of the first and second antenna sets. However, the present embodiment may be applied to FIGS. 12(a) and 12(b) in the same manner.

Compared to the method described with reference to FIG. 6, the embodiment of FIG. 12 saves considerable resources required for repetitive transmission by reducing additionally used resources in half. Therefore, by applying the repetitive transmission according to the present embodiment, resources for data transmission are used more efficiently.

In accordance with another embodiment of the present invention, a plurality of OFDM symbols may be applied. As described above, an SFBC/FSTD scheme was applied for a single time unit according to an embodiment of the present invention. However, transmitting a signal using a plurality of time units may be considered. In the following description, a single OFDM symbol is defined as a time unit in a communication system adopting orthogonal frequency division multiplexing. Accordingly, a method for transmitting a signal using a plurality of OFDM symbols is explained as follows.

When transmitting via a plurality of OFDM symbols, repetitive transmission on a time axis as well as a frequency axis is possible to obtain diversity in addition to transmitting antenna diversity. Specifically, in the following description, exemplarily described is a case where CDM and SFBC/FSTD schemes are applied to a spread signal for an ACK/NAK signal transmitted in downlink to announce the successful/failed reception of data transmitted in uplink.

Figure 13:
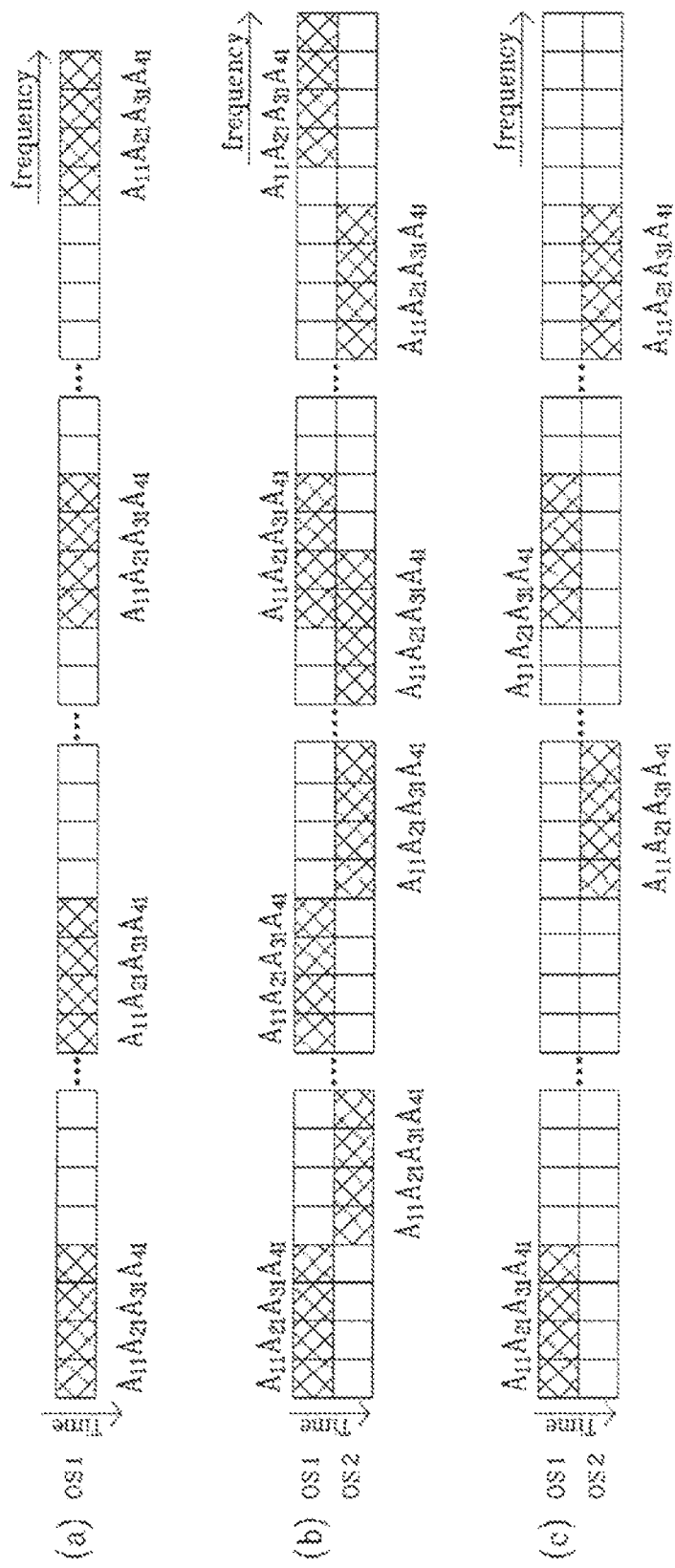
FIG. 13 is a diagram explaining an example of a method for transmitting a spread signal via a plurality of OFDM symbols in a mobile communication system in accordance with one embodiment of the present invention.

FIG. 13 is a diagram explaining an example of a method for transmitting a spread signal via a plurality of OFDM symbols in a mobile communication system in accordance with one embodiment of the present invention. Referring to FIG. 13, each small box indicates a resource element (RE) constructed with a single OFDM symbol and a single subcarrier. $A_{ij}$ may indicate and ACK/NAK signal multiplexed by CDM, wherein i indicates an index of a multiplexed signal after spreading, and j indicates an ACK/NAK channel index of the multiplexed ACK/NAK signal. Here, the ACK/NAK channel indicates a set of multiplexed ACK/NAK signals. Moreover, there can exist a plurality of ACK/NAK channels according to a necessity and resource situation of each system. For clarity and convenience of description, a single ACK/NAK channel exists in FIG. 13.

In FIG. 13(a), shown is an example where a multiplexed ACK/NAK signal is transmitted via a single OFDM symbol. Preferably, four ACK/NAK signals are spread by a spreading factor SF=4 for a single OFDM symbol, multiplexed by CDM, and then transmitted via four neighbor subcarriers $(A_{11}, A_{21}, A_{31}, A_{41})$. Because a single OFDM symbol is used for the ACK/NAK signal transmission, diversity gain on a time axis for the ACK/NAK signal transmission may not be obtained. However, four repetitive transmissions of the ACK/NAK signal multiplexed by CDM along a frequency axis may be performed. Accordingly, the four-time repetition facilitates diversity via repetition, wherein a repetition count varies according to a channel status and/or a resource status of the system.

In FIG. 13(b), shown is an example where a multiplexed ACK/NAK signal is transmitted via a plurality of OFDM symbols. Referring to FIG. 13(b), four ACK/NAK signals are spread by a spreading factor SF=4 for two OFDM symbols each, multiplexed by CDM, and then transmitted via four neighbor subcarriers. Preferably, when OFDM symbols for ACK/NAK signal transmission increase, the ACK/NAK signal used for a single OFDM symbol may be repetitively used for the increased OFDM symbols as it is. However, when the ACK/NAK signal is repetitively transmitted for a second OFDM symbol, transmission is performed to maximize use of subcarriers that are not overlapped with former subcarriers used for a first OFDM symbol. This is preferable when considering a frequency diversity effect.

In FIG. 13(b), the number of ACK/NAK signals transmittable despite the increased number of OFDM symbols is equal to the case of using a single OFDM symbol. According to the present embodiment, an ACK/NAK signal, which was repeated on a frequency axis only when using a single OFDM symbol, can be transmitted using more time-frequency resources for transmitting the same number of ACK/NAK signals by substantially incrementing the repetition count of time-frequency. Here, because OFDM symbols used for the ACK/NAK transmission are increased, more signal power used for the ACK/NAK transmission can be allocated. Hence, the ACK/NAK signal may be transmitted to a cell having a wider area.

In FIG. 13(*c*), shown is another example where a multiplexed ACK/NAK signal is transmitted via a plurality of OFDM symbols. Referring to FIG. 13(*c*), when the number of OFDM symbols for ACK/NAK signal transmission is incremented to 2, transmission may be performed by reducing the frequency-axis repetition count of the ACK/NAK signal multiplexed by CDM. Thus, by performing the transmission by decreasing the repetition count when the number of OFDM symbols is incremented to 2, resources are efficiently utilized.

Compared to the transmission method shown in FIG. 13(*b*), four-time frequency-axis repetitions of ACK/NAK signal are reduced to two-time repetitions in FIG. 13(*c*). However, because the number of OFDM symbols used for ACK/NAK signal transmission is incremented, compared with the case of using a single OFDM symbol in FIG. 13(*a*), FIG. 13(*c*) is no different in that four time-frequency resource areas are available.

Compared to the method shown in FIG. 13(*b*), the method of FIG. 13(*c*) shows that signal power for ACK/NAK channel transmission may be reduced because the number of time-frequency resource areas used for a single ACK/NAK channel transmission is reduced. However, because the ACK/NAK channel is transmitted across the time-frequency areas, per-symbol transmission power allocation may be performed more efficiently than the case of transmitting via a single OFDM symbol only.

In case that ACK/NAK signals are repetitively transmitted in the same structure for all OFDM symbols to simplify a scheduling operation on a system, e.g., the time-frequency resources shown in FIG. 13(*b*) are used, different ACK/NAK channels may be transmitted. In particular, because twice as many ACK/NAK channels may be transmittable, resources are more efficiently used.

Preferably, a spreading factor for multiplexing a plurality of ACK/NAK signals, a repetition count in time-frequency domain, and the number of OFDM symbols for ACK/NAK signal transmission, which are explained with reference to FIG. 13, are exemplarily provided for a more accurate description of the present invention. It is understood that different spreading factors, different repetition counts and various OFDM symbol numbers are applicable to the present invention. Moreover, the embodiment shown in FIG. 13 relates to using a single transmitting antenna not using transmitting antenna diversity, but is also applicable to a 2-transmitting antenna diversity method, a 4-transmitting antenna diversity method, and the like.

Figure 14:
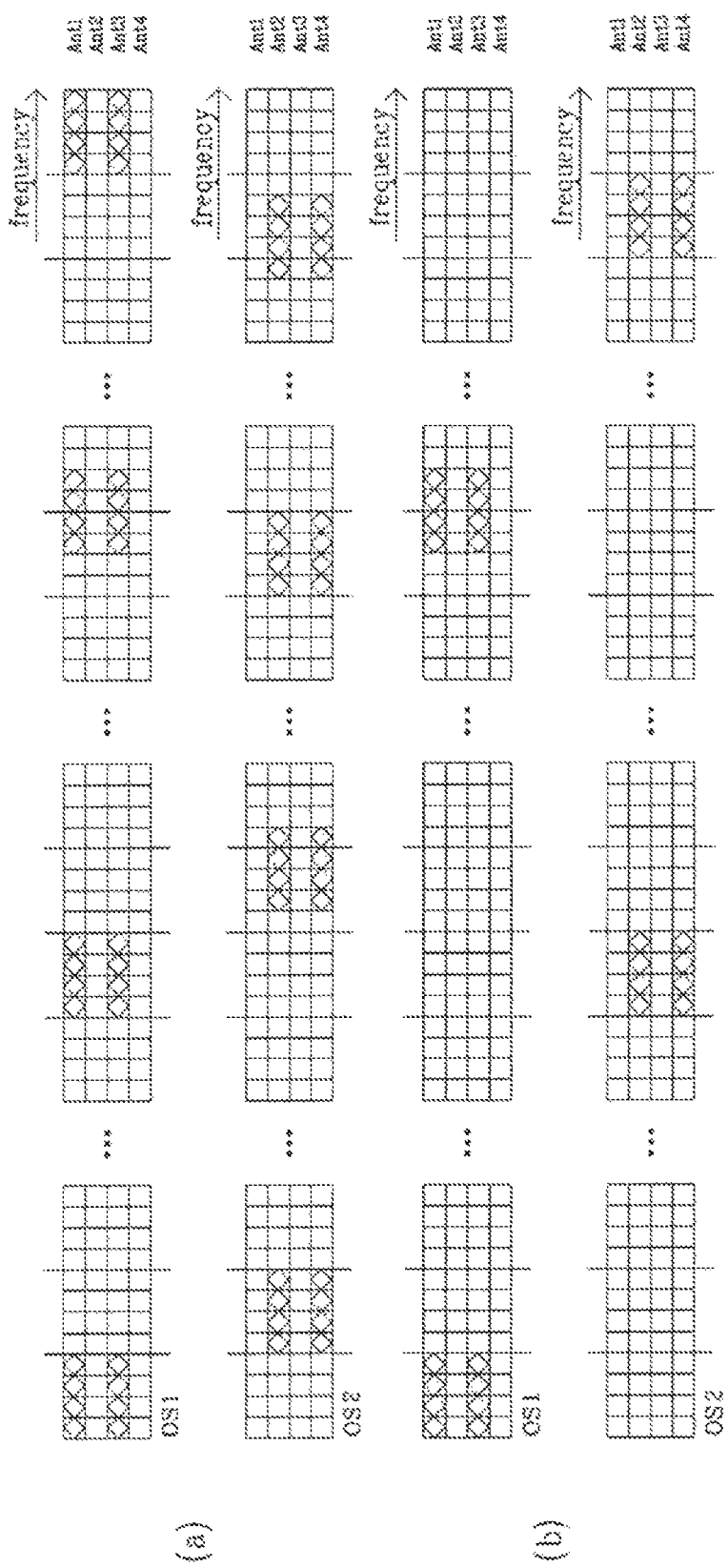
FIG. 14 is a diagram explaining an example of a method for transmitting a spread signal via a plurality of OFDM symbols in a mobile communication system in accordance with one embodiment of the present invention in which an SFBC/FSTD scheme is applied to the spread signal.

FIG. 14 is a diagram explaining an example of a method for transmitting a spread signal via a plurality of OFDM symbols in a mobile communication system in accordance with one embodiment of the present invention, wherein an SFBC/FSTD scheme is applied to the spread signal. Preferably, an embodiment for implementing a 4-degree transmitting antenna diversity effect using a total of four transmitting antennas is explained with reference to FIG. 14. For clarity and convenience of description, a single ACK/NAK channel exists.

In FIG. 14(*a*), an SFBC/FSTD scheme is applied to a spread signal using four transmitting antennas and the signal is transmitted for a plurality of OFDM symbols. Four ACK/NAK signals are spread by a spreading factor SF=4 for two OFDM symbols each, multiplexed by CDM, and then transmitted via four neighbor subcarriers. Preferably, when OFDM symbols for ACK/NAK signal transmission increase, the ACK/NAK signal used for a single OFDM symbol may be repetitively used for the increased OFDM symbols as it is. This is similar to the process described with reference to FIG. 13 (*b*).

However, when a repetitive transmission is carried out for a second OFDM symbol, transmission is performed using an antenna set different from an antenna set used for a first OFDM symbol. For example, if a transmission for a first OFDM symbol is performed using a first antenna set including a first antenna and third antenna, a transmission for a second OFDM symbol may be performed using a second antenna set including a second antenna and fourth antenna. Preferably, transmission is performed to maximize use of subcarriers that are not overlapped with former subcarriers used for the first OFDM symbol. This is preferable when considering a frequency diversity effect.

In FIG. 14(*b*), shown is another example of applying an SFBC/FSTD scheme to a spread signal using four transmitting antennas and transmitting the signal for a plurality of OFDM symbols. Preferably, when the number of OFDM symbols for ACK/NAK signal transmission is incremented to 2, the signal may be transmitted by reducing a frequency-axis repetition count of the ACK/NAK signal multiplexed by CDM. This is similar to the process described with reference to FIG. 13(*c*). However, when repetitive transmission is performed for a second OFDM symbol, the transmission will be carried out using an antenna set different from an antenna set used for the first OFDM symbol.

In the above description of the examples shown in FIGS. 13 and 14, the signal spread by SF=4 is transmitted via at least one OFDM symbol only. However, the present embodiment is applicable to a case of using several OFDM symbols in case of a spreading factor SF=2. Preferably, for the spreading factor SF=2, two spread signals spread by SF=2 are transmitted each using two of four subcarriers allocated to transmit a spread signal spread by SF=4. Alternatively, a two-time repetition method is applicable thereto.

In case of transmission via several OFDM symbols, repetition on a time axis as well as a frequency axis is applicable to obtain diversity in addition to transmitting antenna diversity. The above embodiments are provided to explain the applications of the present invention and are also applicable to a system using an SFBC/FSTD transmission diversity method regardless of various spreading factors (SF), various OFDM symbol numbers and repetition counts on time and frequency axes.

Figure 15:
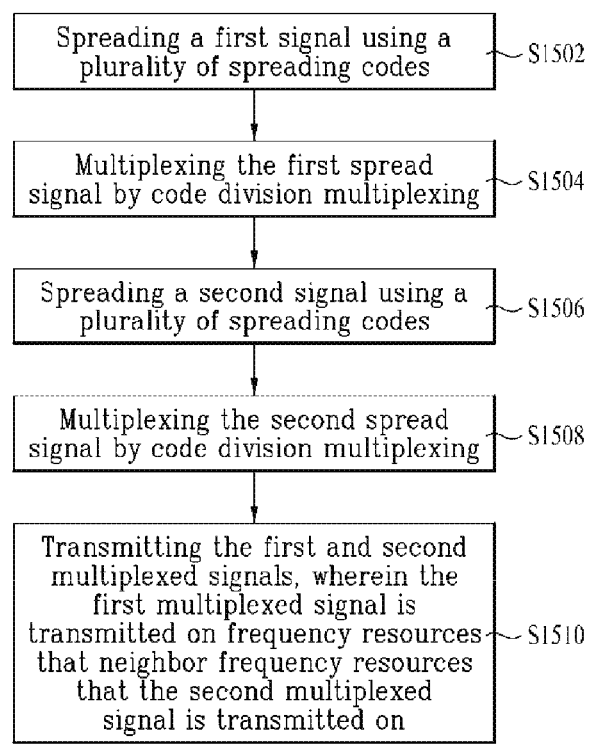
FIG. 15 is a diagram explaining an example of a method for transmitting a spread signal in a mobile communication system in accordance with one embodiment of the present invention.

FIG. 15 is a diagram explaining an example of a method for transmitting a spread signal in a mobile communication system in accordance with one embodiment of the present invention. Referring to FIG. 15, a first signal is spread using a plurality of spreading codes, wherein the plurality of spreading codes have a spreading factor (S1502). The first spread signal is multiplexed by code division multiplexing (S1504). Similarly, a second signal is spread using a plurality of spreading codes, wherein the plurality of spreading codes have a spreading factor (S1506). The second spread signal is multiplexed by code division multiplexing (S1508). The first and second multiplexed signals are transmitted, wherein the first multiplexed signal is transmitted on frequency resources that neighbor frequency resources that the second multiplexed signal is transmitted on (S1510). The first and second multiplexed signals are transmitted via frequency resources of an OFDM symbol of a first antenna set and a second antenna set.

Figure 16:
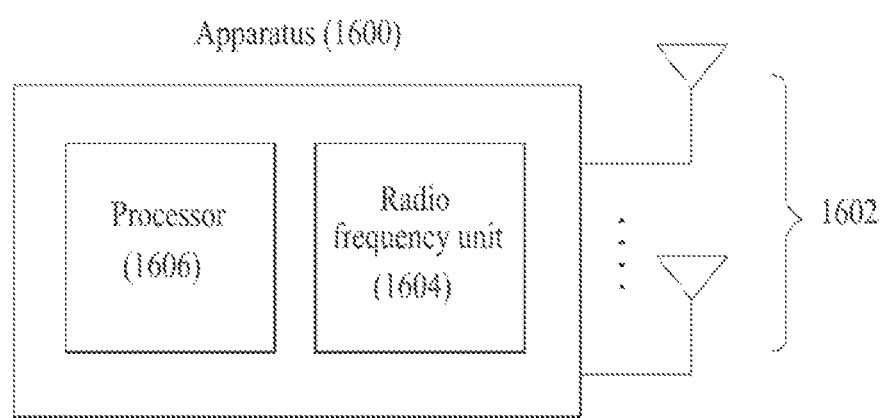
FIG. 16 is a diagram explaining an example of an apparatus for receiving Acknowledgement/Negative acknowledgement (ACK/NACK) information in a mobile communication system in accordance with one embodiment of the present invention.

FIG. 16 is a diagram explaining an example of an apparatus for receiving ACK/NACK information in a mobile communication system in accordance with one embodiment of the present invention. Referring to FIG. 16, the apparatus (1600), such as a user equipment, comprises a plurality of antennas (1602), a radio frequency unit (1604), and a processor (1606). The processor (1606) is configured to carry out various operations exemplified in the specification and drawings.

FIG. 17 is a diagram explaining an example of a method for receiving ACK/NACK information in a mobile communication system in accordance with one embodiment of the present invention. Referring to FIG. 16 and FIG. 17, the apparatus (1600) receives a first signal including first spread ACK/NACK information and second spread ACK/NACK information from a first antenna set of a transmitting end in an orthogonal frequency division multiplexing (OFDM) symbol (S1702); receives a second signal including third spread ACK/NACK information and fourth spread ACK/NACK information from a second antenna set of the transmitting end in an OFDM symbol (S1704); and de-spread at least the first and third spread ACK/NACK information or the second and fourth spread ACK/NACK information for identifying the ACK/NACK information (S1706).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Embodiments of the present invention can be implemented by various means, e.g., hardware, firmware, software, and any combination thereof. In case of the implementation by hardware, a method of transmitting a spread signal in a communication system according to one embodiment of the present invention can be implemented by at least one of application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

In case of implementation by firmware or software, a method of transmitting a spread signal in a communication system according to one embodiment of the present invention can be implemented by a module, procedure, function and the like capable of performing the above mentioned functions or operations. Software code is stored in a memory unit and can be driven by a processor. The memory unit is provided within or outside the processor to exchange data with the processor by various means known in public.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for communicating Acknowledgement/Negative acknowledgement (ACK/NACK) information in a mobile communication system, the method comprising:

transmitting, by a base station, a first signal including first spread ACK/NACK information and second spread ACK/NACK information on a first set of four available neighboring subcarriers in an orthogonal frequency division multiplexing (OFDM) symbol, wherein the first spread ACK/NACK information and the second spread ACK/NACK information are coded on the first set of four available neighboring subcarriers as shown in Table 1;

receiving, by a terminal, the first signal including the first spread ACK/NACK information and the second spread ACK/NACK information on the first set of four available neighboring subcarriers;

transmitting, by the base station, a second signal including third spread ACK/NACK information and fourth spread ACK/NACK information on a second set of four available neighboring subcarriers in an OFDM symbol, wherein the third spread ACK/NACK information and the fourth spread ACK/NACK information are coded on the second set of four available neighboring subcarriers as shown in Table 2; and receiving, by the terminal, the second signal including the third spread ACK/NACK information and the fourth spread ACK/NACK information on the second set of four available neighboring subcarriers,

TABLE 1

| | First set of four available neighboring subcarriers in an OFDM symbol | | | |
|---|---|---|---|---|
| antenna A | $a_1$ | $a_2$ | $b_1$ | $b_2$ |
| antenna B | $-a_2^*$ | $a_1^*$ | $-b_2^*$ | $b_1^*$ |
| antenna C | 0 | 0 | 0 | 0 |
| antenna D | 0 | 0 | 0 | 0 |

TABLE 2

| | Second set of four available neighboring subcarriers in an OFDM symbol | | | |
|---|---|---|---|---|
| antenna A | 0 | 0 | 0 | 0 |
| antenna B | 0 | 0 | 0 | 0 |
| antenna C | $c_1$ | $c_2$ | $d_1$ | $d_2$ |
| antenna D | $-c_2^*$ | $c_1^*$ | $-d_2^*$ | $d_1^*$ | wherein $a_1$ to $a_2$ are elements of the first spread ACK/NACK information, $b_1$ to $b_2$ are elements of the second spread ACK/NACK information, $c_1$ to $c_2$ are elements of the third spread ACK/NACK information, $d_1$ to $d_2$ are elements of the fourth ACK/NACK information, and the symbol * denotes a conjugate operation, wherein the first spread ACK/NACK information and the third spread ACK/NACK information carry first ACK/NACK information, wherein the second spread ACK/NACK information and the fourth spread ACK/NACK information carry second ACK/NACK information, and wherein the first set of four available neighboring subcarriers is separated from the second set of four available neighboring subcarriers by a plurality of subcarriers in a frequency domain.

2. The method of claim 1, further comprising:
de-spreading, by the terminal, either the first and third spread ACK/NACK information or the second and fourth ACK/NACK information for identifying ACK/NACK information allocated to the terminal.

3. The method of claim 1, further comprising:
processing, by the terminal, the first signal based on a coding scheme of the first spread ACK/NACK information and the second spread ACK/NACK information; and processing, by the terminal, the second signal based on a coding scheme of the third spread ACK/NACK information and the fourth spread ACK/NACK information.

4. The method of claim 1, wherein the first set of four available neighboring subcarriers and the second set of four available neighboring subcarriers are on different OFDM symbols.

5. The method of claim 1, further comprising:

transmitting, by the base station, a third signal including fifth spread ACK/NACK information and sixth spread ACK/NACK information on a third set of four available neighboring subcarriers in an OFDM symbol, wherein the fifth spread ACK/NACK information and the sixth spread ACK/NACK information are coded on the third set of four available neighboring subcarriers as shown in Table 3; and receiving, by the terminal, the third signal including the fifth spread ACK/NACK information and the sixth spread ACK/NACK information on the third set of four available neighboring subcarriers:

TABLE 3

Third set of four available neighboring subcarriers in an OFDM symbol

| | | | | |
|---|---|---|---|---|
| antenna A | $e_1$ | $e_2$ | $f_1$ | $f_2$ |
| antenna B | $-e_2^*$ | $e_1^*$ | $-f_2^*$ | $f_1^*$ |
| antenna C | 0 | 0 | 0 | 0 |
| antenna D | 0 | 0 | 0 | 0 | wherein $e_1$ to $e_2$ are elements of the fifth spread ACK/NACK information, and $f_1$ to $f_2$ are elements of the sixth spread ACK/NACK information, wherein the fifth spread ACK/NACK information carries the first ACK/NACK information, and the sixth spread ACK/NACK information carries the second ACK/NACK information, and wherein the first set of four available neighboring subcarriers is separated from the third set of four available neighboring subcarriers by a plurality of subcarriers in the frequency domain.

6. A method for receiving Acknowledgement/Negative acknowledgement (ACK/NACK) information in a mobile communication system, the method comprising:

receiving, by a terminal, a first signal including first spread ACK/NACK information and second spread ACK/NACK information on a first set of four available neighboring subcarriers in an orthogonal frequency division multiplexing (OFDM) symbol; and receiving, by the terminal, a second signal including third spread ACK/NACK information and fourth spread ACK/NACK information on a second set of four available neighboring subcarriers in an OFDM symbol, wherein the first spread ACK/NACK information and the second spread ACK/NACK information are coded on the first set of four available neighboring subcarriers as shown in Table 1, wherein the third spread ACK/NACK information and the fourth spread ACK/NACK information are coded on the second set of four available neighboring subcarriers as shown in Table 2:

TABLE 1

First set of four available neighboring subcarriers in an OFDM symbol

| | | | | |
|---|---|---|---|---|
| antenna A | $a_1$ | $a_2$ | $b_1$ | $b_2$ |
| antenna B | $-a_2^*$ | $a_1^*$ | $-b_2^*$ | $b_1^*$ |
| antenna C | 0 | 0 | 0 | 0 |
| antenna D | 0 | 0 | 0 | 0 |

TABLE 2

Second set of four available neighboring subcarriers in an OFDM symbol

| | | | | |
|---|---|---|---|---|
| antenna A | 0 | 0 | 0 | 0 |
| antenna B | 0 | 0 | 0 | 0 |
| antenna C | $c_1$ | $c_2$ | $d_1$ | $d_2$ |
| antenna D | $-c_2^*$ | $c_1^*$ | $-d_2^*$ | $d_1^*$ | wherein $a_1$ to $a_2$ are elements of the first spread ACK/NACK information, $b_1$ to $b_2$ are elements of the second spread ACK/NACK information, $c_1$ to $c_2$ are elements of the third spread ACK/NACK information, $d_1$ to $d_2$ are elements of the fourth ACK/NACK information, and the symbol * denotes a conjugate operation, wherein the first spread ACK/NACK information and the third spread ACK/NACK information carry first ACK/NACK information, wherein the second spread ACK/NACK information and the fourth spread ACK/NACK information carry second ACK/NACK information, and wherein the first set of four available neighboring subcarriers is separated from the second set of four available neighboring subcarriers by a plurality of subcarriers in a frequency domain.

7. The method of claim 6, further comprising:

de-spreading, by the terminal, either the first and third spread ACK/NACK information or the second and fourth ACK/NACK information for identifying ACK/NACK information allocated to the terminal.

8. The method of claim 6, further comprising:

processing, by the terminal, the first signal based on a coding scheme of the first spread ACK/NACK information and the second spread ACK/NACK information; and processing, by the terminal, the second signal based on a coding scheme of the third spread ACK/NACK information and the fourth spread ACK/NACK information.

9. The method of claim 6, wherein the first set of four available neighboring subcarriers and the second set of four available neighboring subcarriers are on different OFDM symbols.

10. The method of claim 6, further comprising:

receiving, by the terminal, a third signal including fifth spread ACK/NACK information and sixth spread ACK/NACK information on a third set of four available neighboring subcarriers in an OFDM symbol, wherein the fifth spread ACK/NACK information and the sixth spread ACK/NACK information are coded on the third set of four available neighboring subcarriers as shown in Table 3:

TABLE 3

Third set of four available neighboring subcarriers in an OFDM symbol

| | | | | |
|---|---|---|---|---|
| antenna A | $e_1$ | $e_2$ | $f_1$ | $f_2$ |
| antenna B | $-e_2^*$ | $e_1^*$ | $-f_2^*$ | $f_1^*$ |
| antenna C | 0 | 0 | 0 | 0 |
| antenna D | 0 | 0 | 0 | 0 | wherein $e_1$ to $e_2$ are elements of the fifth spread ACK/NACK information, $f_1$ to $f_2$ are elements of the sixth spread ACK/NACK information, wherein the fifth spread ACK/NACK information carries the first ACK/NACK information, and the sixth spread ACK/NACK information carries the second ACK/NACK information, and wherein the first set of four available neighboring subcarriers is separated from the third set of four available neighboring subcarriers by a plurality of subcarriers in the frequency domain.

11. A mobile communication system including a base station and a terminal, wherein:

the base station is configured to transmit a first signal including first spread Acknowledgement/Negative acknowledgement (ACK/NACK) information and second spread ACK/NACK information on a first set of four available neighboring subcarriers in an orthogonal frequency division multiplexing (OFDM) symbol, wherein the first spread ACK/NACK information and the second spread ACK/NACK information are coded on the first set of four available neighboring subcarriers as shown in Table 1;

the terminal is configured to receive the first signal including the first spread ACK/NACK information and the second spread ACK/NACK information on the first set of four available neighboring subcarriers;

the base station is further configured to transmit a second signal including third spread ACK/NACK information and fourth spread ACK/NACK information on a second set of four available neighboring subcarriers in an OFDM symbol, wherein the third spread ACK/NACK information and the fourth spread ACK/NACK information are coded on the second set of four available neighboring subcarriers as shown in Table 2; and the terminal is further configured to receive the second signal including the third spread ACK/NACK information and the fourth spread ACK/NACK information on the second set of four available neighboring subcarriers,

TABLE 1

First set of four available neighboring subcarriers in an OFDM symbol

| | | | | |
|---|---|---|---|---|
| antenna A | $a_1$ | $a_2$ | $b_1$ | $b_2$ |
| antenna B | $-a_2^*$ | $a_1^*$ | $-b_2^*$ | $b_1^*$ |
| antenna C | 0 | 0 | 0 | 0 |
| antenna D | 0 | 0 | 0 | 0 |

TABLE 2

Second set of four available neighboring subcarriers in an OFDM symbol

| | | | | |
|---|---|---|---|---|
| antenna A | 0 | 0 | 0 | 0 |
| antenna B | 0 | 0 | 0 | 0 |
| antenna C | $c_1$ | $c_2$ | $d_1$ | $d_2$ |
| antenna D | $-c_2^*$ | $c_1^*$ | $-d_2^*$ | $d_1^*$ | wherein $a_1$ to $a_2$ are elements of the first spread ACK/NACK information, $b_1$ to $b_2$ are elements of the second spread ACK/NACK information, $c_1$ to $c_2$ are elements of the third spread ACK/NACK information, $d_1$ to $d_2$ are elements of the fourth ACK/NACK information, and the symbol * denotes a conjugate operation, wherein the first spread ACK/NACK information and the third spread ACK/NACK information carry first ACK/NACK information, wherein the second spread ACK/NACK information and the fourth spread ACK/NACK information carry second ACK/NACK information, and wherein the first set of four available neighboring subcarriers is separated from the second set of four available neighboring subcarriers by a plurality of subcarriers in a frequency domain.

12. The mobile communication system of claim 11, wherein the terminal is further configured to de-spread either the first and third spread ACK/NACK information or the second and fourth ACK/NACK information for identifying ACK/NACK information allocated to the terminal.

13. The mobile communication system of claim 11, wherein the terminal is further configured to:

process the first signal based on a coding scheme of the first spread ACK/NACK information and the second spread ACK/NACK information; and process the second signal based on a coding scheme of the third spread ACK/NACK information and the fourth spread ACK/NACK information.

14. The mobile communication system of claim 11, wherein the first set of four available neighboring subcarriers and the second set of four available neighboring subcarriers are on different OFDM symbols.

15. The mobile communication system of claim 11, wherein:

the base station is further configured to transmit a third signal including fifth spread ACK/NACK information and sixth spread ACK/NACK information on a third set of four available neighboring subcarriers in an OFDM symbol, wherein the fifth spread ACK/NACK information and the sixth spread ACK/NACK information are coded on the third set of four available neighboring subcarriers as shown in Table 3; and the terminal is further configured to receive the third signal including the fifth spread ACK/NACK information and the sixth spread ACK/NACK information on the third set of four available neighboring subcarriers:

TABLE 3

Third set of four available neighboring subcarriers in an OFDM symbol

| | | | | |
|---|---|---|---|---|
| antenna A | $e_1$ | $e_2$ | $f_1$ | $f_2$ |
| antenna B | $-e_2^*$ | $e_1^*$ | $-f_2$ | $f_1^*$ |
| antenna C | 0 | 0 | 0 | 0 |
| antenna D | 0 | 0 | 0 | 0 | wherein $e_1$ to $e_2$ are elements of the fifth spread ACK/NACK information, and $f_1$ to $f_2$ are elements of the sixth spread ACK/NACK information, wherein the fifth spread ACK/NACK information carries the first ACK/NACK information, and the sixth spread ACK/NACK information carries the second ACK/NACK information, and wherein the first set of four available neighboring subcarriers is separated from the third set of four available neighboring subcarriers by a plurality of subcarriers in the frequency domain.

16. A terminal for use in a mobile communication system, wherein the terminal is configured to:

receive a first signal including first spread ACK/NACK information and second spread ACK/NACK information on a first set of four available neighboring subcarriers in an orthogonal frequency division multiplexing (OFDM) symbol; and receive a second signal including third spread ACK/NACK information and fourth spread ACK/NACK information on a second set of four available neighboring subcarriers in an OFDM symbol, wherein the first spread ACK/NACK information and the second spread ACK/NACK information are coded on the first set of four available neighboring subcarriers as shown in Table 1, wherein the third spread ACK/NACK information and the fourth spread ACK/NACK information are coded on the second set of four available neighboring subcarriers as shown in Table 2:

TABLE 1

| | First set of four available neighboring subcarriers in an OFDM symbol | | | |
|---|---|---|---|---|
| antenna A | $a_1$ | $a_2$ | $b_1$ | $b_2$ |
| antenna B | $-a_2^*$ | $a_1^*$ | $-b_2^*$ | $b_1^*$ |
| antenna C | 0 | 0 | 0 | 0 |
| antenna D | 0 | 0 | 0 | 0 |

TABLE 2

| | Second set of four available neighboring subcarriers in an OFDM symbol | | | |
|---|---|---|---|---|
| antenna A | 0 | 0 | 0 | 0 |
| antenna B | 0 | 0 | 0 | 0 |
| antenna C | $c_1$ | $c_2$ | $d_1$ | $d_2$ |
| antenna D | $-c_2^*$ | $c_1^*$ | $-d_2^*$ | $d_1^*$ | wherein $a_1$ to $a_2$ are elements of the first spread ACK/NACK information, $b_1$ to $b_2$ are elements of the second spread ACK/NACK information, $c_1$ to $c_2$ are elements of the third spread ACK/NACK information, $d_1$ to $d_2$ are elements of the fourth ACK/NACK information, and the symbol * denotes a conjugate operation, wherein the first spread ACK/NACK information and the third spread ACK/NACK information carry first ACK/NACK information, wherein the second spread ACK/NACK information and the fourth spread ACK/NACK information carry second ACK/NACK information, and wherein the first set of four available neighboring subcarriers is separated from the second set of four available neighboring subcarriers by a plurality of subcarriers in a frequency domain.

17. The terminal of claim 16, wherein the terminal is further configured to de-spread either the first and third spread ACK/NACK information or the second and fourth ACK/NACK information for identifying ACK/NACK information allocated to the terminal.

18. The terminal of claim 16, wherein the terminal is further configured to:

process the first signal based on a coding scheme of the first spread ACK/NACK information and the second spread ACK/NACK information; and process the second signal based on a coding scheme of the third spread ACK/NACK information and the fourth spread ACK/NACK information.

19. The terminal of claim 16, wherein the first set of four available neighboring subcarriers and the second set of four available neighboring subcarriers are on different OFDM symbols.

20. The terminal of claim 16, wherein the terminal is further configured to receive a third signal including fifth spread ACK/NACK information and sixth spread ACK/NACK information on a third set of four available neighboring subcarriers in an OFDM symbol, wherein the fifth spread ACK/NACK information and the sixth spread ACK/NACK information are coded on the third set of four available neighboring subcarriers as shown in Table 3:

TABLE 3

| | Third set of four available neighboring subcarriers in an OFDM symbol | | | |
|---|---|---|---|---|
| antenna A | $e_1$ | $e_2$ | $f_1$ | $f_2$ |
| antenna B | $-e_2^*$ | $e_1^*$ | $-f_2^*$ | $f_1^*$ |
| antenna C | 0 | 0 | 0 | 0 |
| antenna D | 0 | 0 | 0 | 0 | wherein $e_1$ to $e_2$ are elements of the fifth spread ACK/NACK information, $f_1$ to $f_2$ are elements of the sixth spread ACK/NACK information, wherein the fifth spread ACK/NACK information carries the first ACK/NACK information, and the sixth spread ACK/NACK information carries the second ACK/NACK information, and wherein the first set of four available neighboring subcarriers is separated from the third set of four available neighboring subcarriers by a plurality of subcarriers in the frequency domain.

* * * * *